(12) United States Patent
Shigeeda et al.

(10) Patent No.: US 7,424,548 B1
(45) Date of Patent: Sep. 9, 2008

(54) METHOD FOR TRANSFERRING DATA AND A DESTINATION DATABASE

(75) Inventors: Tetuya Shigeeda, Tokyo (JP); Yasuo Maeda, Tokyo (JP); Koich Murayama, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/510,194

(22) Filed: Feb. 22, 2000

(30) Foreign Application Priority Data

Feb. 22, 1999 (JP) ............................... 11-042930

(51) Int. Cl.
G06F 15/173 (2006.01)
G06F 12/00 (2006.01)
G06F 17/30 (2006.01)
(52) U.S. Cl. ........................ 709/238; 707/203
(58) Field of Classification Search ................. 709/228, 709/220, 221, 206; 370/392, 351, 352, 401, 370/225; 707/10, 104; 726/27–30
See application file for complete search history.

(56) References Cited

U.S. PATENT DOCUMENTS

| | | | | |
|---|---|---|---|---|
| 4,974,149 A | * | 11/1990 | Valenti | ........................ 709/217 |
| 5,265,092 A | | 11/1993 | Soloway et al. | |
| 5,563,881 A | * | 10/1996 | Perelman et al. | ............. 370/428 |
| 5,579,307 A | * | 11/1996 | Richetta et al. | .............. 370/409 |
| 5,602,841 A | * | 2/1997 | Lebizay et al. | ............... 370/413 |
| 5,608,726 A | | 3/1997 | Virgile | |
| 5,612,959 A | | 3/1997 | Takase et al. | |
| 5,745,679 A | * | 4/1998 | Mercer | ........................ 707/203 |
| 5,790,803 A | * | 8/1998 | Kinoshita et al. | ............ 709/245 |
| 5,805,830 A | * | 9/1998 | Reese et al. | .................. 709/205 |
| 5,828,844 A | * | 10/1998 | Civanlar et al. | ............. 709/228 |
| 5,831,975 A | | 11/1998 | Chen et al. | |
| 5,864,684 A | * | 1/1999 | Nielsen | ....................... 709/206 |
| 5,883,890 A | * | 3/1999 | Okanoue et al. | ............. 370/338 |
| 5,899,998 A | * | 5/1999 | McGauley et al. | ........ 707/104.1 |
| 5,903,545 A | * | 5/1999 | Sabourin et al. | ............. 370/225 |
| 5,995,982 A | * | 11/1999 | Mercer | ........................ 707/203 |
| 6,038,212 A | * | 3/2000 | Galand et al. | ................ 370/216 |
| 6,049,524 A | * | 4/2000 | Fukushima et al. | .......... 370/220 |

(Continued)

FOREIGN PATENT DOCUMENTS

JP 7-141242 A 6/1995

(Continued)

OTHER PUBLICATIONS

Comer, Douglas E. Internetworking with TCP/IP vol. 1: Principles, Protocols, and Architecture. 1995. Prenctice Hall 4th Edition, vol. 1. pp. 77-88; 95-176; 209-252.*

(Continued)

*Primary Examiner*—Christian LaForgia
(74) *Attorney, Agent, or Firm*—Birch, Stewart, Kolasch & Birch, LLP

(57) ABSTRACT

A data transfer method is used to transfer data via a physical transfer system among a plurality of independently provided transmitter/receiver apparatuses. In the data transfer method, when data is transferred, a database of a transfer-scheduled transmitter/receiver is added to the data, and then the database-added data is transferred.

17 Claims, 12 Drawing Sheets

U.S. PATENT DOCUMENTS

| | | | |
|---|---|---|---|
| 6,067,567 A * | 5/2000 | Bartfai et al. | 709/221 |
| 6,157,644 A * | 12/2000 | Bernstein et al. | 370/392 |
| 6,167,044 A * | 12/2000 | de Vos et al. | 370/389 |
| 6,262,974 B1 * | 7/2001 | Chevalier et al. | 370/232 |
| 6,282,564 B1 * | 8/2001 | Smith et al. | 709/206 |
| 6,310,881 B1 * | 10/2001 | Zikan et al. | 370/401 |
| 6,310,883 B1 * | 10/2001 | Mann et al. | 370/408 |
| 6,314,093 B1 * | 11/2001 | Mann et al. | 370/351 |
| 6,385,174 B1 * | 5/2002 | Li | 370/252 |
| 6,396,833 B1 * | 5/2002 | Zhang et al. | 370/392 |
| 6,421,674 B1 * | 7/2002 | Yoakum et al. | 707/10 |
| 6,442,615 B1 * | 8/2002 | Nordenstam et al. | 709/241 |
| 6,449,251 B1 * | 9/2002 | Awadallah et al. | 370/229 |
| 6,496,510 B1 * | 12/2002 | Tsukakoshi et al. | 370/401 |
| 6,519,248 B1 * | 2/2003 | Valko | 370/352 |

FOREIGN PATENT DOCUMENTS

| | | |
|---|---|---|
| JP | 8307451 | 11/1996 |
| WO | WO 0064100 | 10/2000 |

OTHER PUBLICATIONS

Comer, Douglas E. Internetworking with TCP/IP vol. 1: Principles, Protocols, and Architecture. 1995. Prenctice Hall 4th Edition, vol. 1. pp. 77-88, 95-176, 209-252.*

* cited by examiner

| DATA TRANSFER DESTINATION | RECEIVED FLAG |
|---|---|
| TRANSMITTER/RECEIVER 1 | 1 |
| TRANSMITTER/RECEIVER 2 | 0 |
| TRANSMITTER/RECEIVER 3 | 0 |
| TRANSMITTER/RECEIVER 4 | 0 |
| | |

| INTERNAL ADDRESS | ADDRESS OF OWN MACHINE |
|---|---|
| COUNTER PARTY ADDRESS | ADDRESS OF TRANSMITTER/RECEIVER A |
| COUNTER PARTY ADDRESS | ADDRESS OF TRANSMITTER/RECEIVER B |

FIG. 10
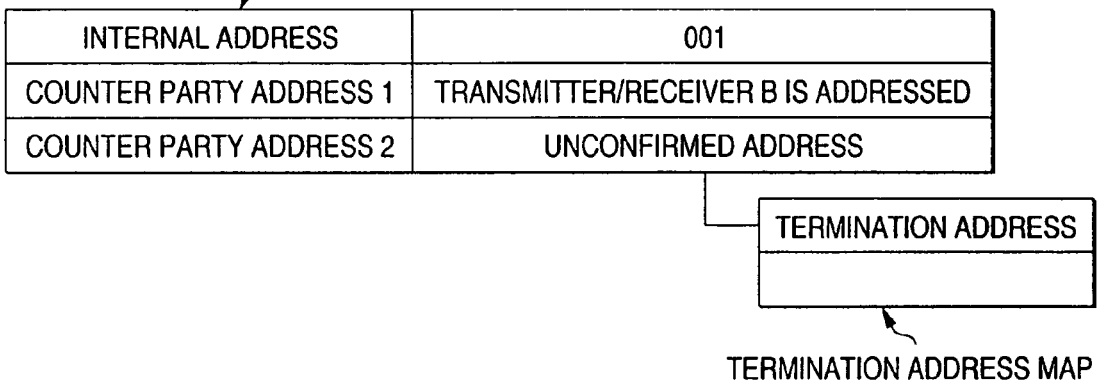
FIG. 11
| INTERNAL ADDRESS | 001 |
|---|---|
| COUNTER PARTY ADDRESS 1 | TRANSMITTER/RECEIVER B IS ADDRESSED |
| COUNTER PARTY ADDRESS 2 | TRANSMITTER/RECEIVER C IS ADDRESSED |
| TERMINATION ADDRESS | UNUSED DISPLAY ADDRESS |
FIG. 12
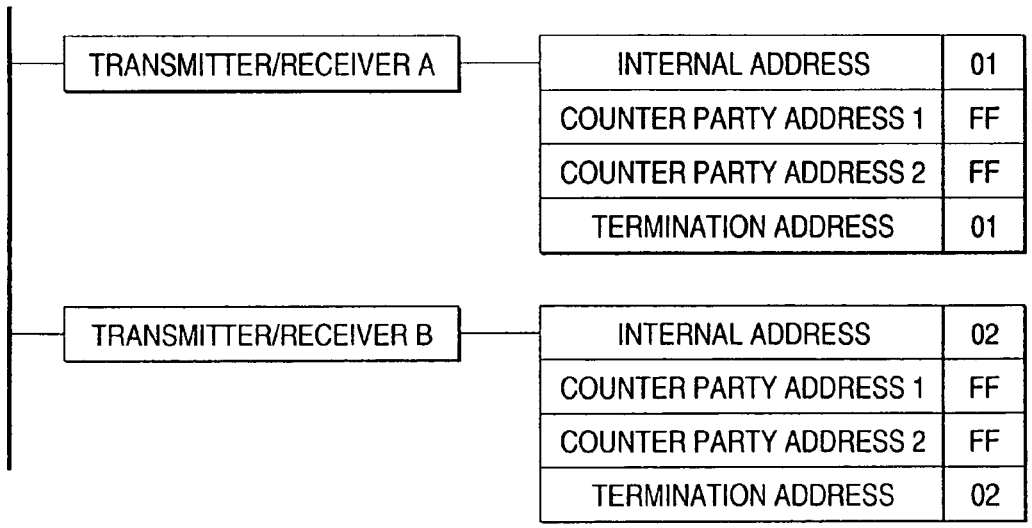

METHOD FOR TRANSFERRING DATA AND A DESTINATION DATABASE

BACKGROUND OF THE INVENTION

1. Field of the Invention

The present invention relates to a data transfer method used to transfer data via a physical transfer system among a plurality of independently provided transmitter/receiver apparatuses, and also relates to a method for forming a database of a transfer-scheduled transmitter/receiver.

2. Description of the Related Art

Conventionally, a data transfer method has been employed to transfer data via a computer network. More specifically, in a conventional computer network, the respective client machines issue a data transfer request to a server machine which has stored data thereinto, and then acquire the requested data from the server machine.

In the conventional data transfer method, since a client machine is communicated with a server machine in a one-to-one correspondence, even when the same data is transmitted from this server machine to a plurality of client machines, the above-described one-to-one communication established between the server machine and the relevant client machine must be repeatedly carried out plural times. Also, in order to utilize the network, various sorts of setting operations should be executed in not only the server machine, but also the client machines. Namely, very cumbersome operations and also very cumbersome setting operations should be carried out by the operators.

SUMMARY OF THE INVENTION

The present invention has been made to solve the above-described problem, and has an object to provide a data transfer method capable of effectively utilizing a transfer system without requiring burdensome operations while data is transferred. More specifically, an object of the present invention is to effectively transfer data among a plurality of transmitters/receivers via a network. As will become evident from the description below the present application often uses the term "own machine" when referring to a particular subject transmitter/receiver and often uses the term "counter Party" when referring to another (e.g., counterpart, peer, etc.) transmitter/receiver.

According to a first aspect of the present invention, there is provided a data transfer method comprising the steps of: adding a database of a transfer-scheduled transmitter/receiver (will be referred to as a "scheduled transfer destination database" hereinafter) to data when the data is transferred; and transferring the added data.

According to a second aspect of the present invention, there is provided a data transfer method comprising the steps of: when data is received by a transmitter/receiver for adding a scheduled transfer destination database to data to thereby transfer the database-added data, describing such a fact that the scheduled transfer destination database has already been received by the transmitter/receiver; selecting an arbitrary transmitter/receiver from such transmitters/receivers which have not yet received the data within transmitters/receivers described in the scheduled transfer destination database; adding the scheduled transfer destination database to the data; and transferring the database-added data to the selected transmitter/receiver.

According to a third aspect of the present invention, there is provided a data transfer method comprising the steps of: when data is received by a transmitter/receiver for adding a scheduled transfer destination database to data to thereby transfer the database-added data, deleting the description of the transmitter/receiver from the scheduled transfer destination database; subdividing the scheduled transfer destination database into 2 databases or more; selecting one transmitter/receiver from the subdivided scheduled transfer destination databases; adding the subdivided scheduled transfer destination database containing the description of the transmitter/receiver to the data; and transferring the database-added data to the selected transmitters/receivers.

According to a fourth aspect of the present invention, there is provided a data transfer method for adding a scheduled transfer destination database to data to thereby transfer the database-added data, wherein: a transmission-source transmitter/receiver which has determined a transfer-destination transmitter/receiver in accordance with the scheduled transfer destination database transmits a transfer preparation signal to the transfer-destination transmitter/receiver before transferring the data; in the case that a load state of the transfer-destination transmitter/receiver is available for the data transfer operation, the transfer-destination transmitter/receiver transmits a transfer preparation completion signal to the transmission-source transmitter/receiver; the transmission-source transmitter/receiver which has received the transfer preparation completion signal commences the data transfer operation; in the case that a load state of the transfer-destination transmitter/receiver is not available for the data transfer operation, the transfer-destination transmitter/receiver transmits a transfer preparation incompletion signal; and the transmission-source transmitter/receiver which has received the transfer preparation incompletion signal repeatedly performs the above sequential operation after determining another transfer-destination transmitter/receiver from the scheduled transfer destination database.

According to a fifth aspect of the present invention, there is provided in a data transfer method performed by a plurality of transmitters/receivers, a method for forming a scheduled transfer destination database wherein a transmitting/receiving unit satisfies the following 4 conditions: condition 1: two transmitters/receivers among the transmitters/receivers for transferring data specify only one transmitters/receivers; condition 2: a transmitter/receiver except for the two transmitters/receivers specifies only two transmitters/receivers; condition 3: a set of transmitters/receivers does not own have a loop-shaped transfer path; and condition 4: a scheduled transfer destination database is formed by using a transmitting/receiving unit satisfying the condition 1, the condition 2, and the condition 3.

According to a sixth aspect of the present invention, there is provided in a data transfer method performed by a plurality of transmitters/receivers, a scheduled transfer destination database forming method wherein: a transmitter/receiver which has received new data transmits information saved in the new data to the respective transmitters/receivers present in a system; when such a transmitter/receiver which has received the saved information does not internally save data corresponding to the saved information, the transmitter/receiver requests a transmission-source transmitter/receiver to transfer data; and the transmission-source transmitter/receiver forms a database of the transmitter/receiver which has issued the request.

According to a seventh aspect of the present invention, there is provided in a data transfer method performed by a plurality of transmitters/receivers, a method for forming a scheduled transfer destination database forming method wherein a transmitting/receiving unit satisfies the following 5 conditions: condition 1: two transmitters/receivers among the transmitters/receivers for transferring data specify only one transmitters/receivers; condition 2: a transmitter receiver except for the two a transmitters/receivers specifies only two transmitters/receivers; condition 3: a set of transmitters/receivers does not have a loop-shaped transfer path; condition 4: a transmitting/receiving unit of all of the transmitters/receivers is specified by using a transmitting/receiving unit satisfying the condition 1, the condition 2, and the condition 3; and condition 5: a transmitter/receiver which has received new data transmits information saved in the new data to all of the transmitters/receivers by using information which specifies the transmitting/receiving unit of all of the transmitters/receivers; when such a transmitter/receiver which has received the saved information does not internally save data corresponding to the saved information, the transmitter/receiver requests a transmission-source transmitter/receiver to transfer data; and the transmission-source transmitter/receiver forms a scheduled transfer destination database having as a transfer destination the transmitter/receiver which has issued the request.

According to an eighth aspect of the present invention, there is provided in a system comprising a plurality of transmitters/receivers, a data transfer method wherein each of the transmitters/receivers satisfies the following 2 conditions: condition 1: two transmitters/receivers contained in the system specify only one transmitter/receiver to thereby transfer data; and condition 2: a transmitter/receiver except for the two transmitters/receivers specifies only two transmitters/receivers to thereby transfer data.

According to a ninth aspect of the present invention, there is provided in a system comprising a plurality of transmitters/receivers, a data transfer method wherein: a transmitter/receiver which has received new data transmits information saved in the new data to the respective transmitter/receivers present in the system; and when such a transmitter/receiver which has received the saved information does not internally save data corresponding to the saved information, the transmitter/receiver requests a transmission-source transmitter/receiver to transfer data.

According to a tenth aspect of the present invention, there is provided in a system comprising a plurality of transmitters/receivers, a data transfer method wherein each of the transmitters/receivers satisfies the following 4 conditions: condition 1: two transmitters/receivers contained in the system have a transmitting/receiving unit which specify only one transmitter/receiver; condition 2: a transmitter/receiver except for the two transmitters/receivers have a transmitting/receiving unit which specifies only two transmitters/receivers; condition 3: a transmitting/receiving unit of all of the transmitters/receivers is specified by using a transmitting/receiving unit satisfying the condition 1 and the condition 2; and condition 4: a transmitter/receiver which has received new data transmits information saved in the new data to the respective transmitters/receivers present in a system; when such a transmitter/receiver which has received the saved information does not internally save data corresponding to the saved information, the transmitter/receiver requests a transmission-source transmitter/receiver to transfer data, and transfers the data in response to the transfer request.

According to an eleventh aspect of the present invention, there is provided in a system comprising a plurality of transmitters/receivers, a data transfer method wherein each of the transmitters/receivers has an extended communication address map satisfying the following 14 conditions, and a transmitter/receiver is specified by using the extended communication address map: condition 1: under initial state of a transmitter/receiver, a communication address map has two unconfirmed addresses; condition 2: the transmitter/receiver transmits the communication address map in a predetermined time interval to such a transmitter/receiver addressed by a counter party address of the communication address map; condition 3: in a case that an own machine address saved in the communication address map is present in a counter party address of the communication address map of the own machine, the transmitter/receiver which has received the communication address map transmits a signal (will be referred to as a "presence confirmation signal" hereinafter) indicative of presence containing information of the own machine address to a transmitter/receiver addressed by the own machine address of the received communication address map; condition 4: in a case that an own machine address saved in the communication address map is not present in a counter party address of the communication address map of the own machine, the transmitter/receiver which has received the communication address map changes the two counter party addresses of the own machine into unconfirmed addresses, and changes a termination address into the own machine address; condition 5: a transmitter/receiver that after having transmitted the communication address map, receives the presence confirmation signals sent from all of the transmitters/receivers addressed by the counter party addresses and for transmitting the communication address maps within a predetermined time period executes no process operation; condition 6: a transmitter/receiver that after having transmitted the communication address map, does not receive the presence confirmation signals sent from all of the transmitters/receivers addressed by the counter party addresses and for transmitting the communication address maps within a predetermined time period changes the two counter party addresses of the own machine into unconfirmed addresses, and changes the termination address into the own machine address; condition 7: a transmitter/receiver having an unconfirmed address is brought into a waiting state for a predetermined time period by using the random number, and thereafter transmits an extended communication address map contained in the own machine to all of the transmitters/receivers; condition 8: in a case that a transmitter/receiver containing a communication address map having a confirmed address receives the extended communication address map executes no process operation; condition 9: in a case that a transmitter/receiver containing a communication address map having an unconfirmed address receives the extended communication address map, the transmitter/receiver writes the own machine address of the received extended communication address map into a counter party address for describing thereon the unconfirmed address of the extended communication address map of the own machine, and transmits the extended communication address map to the own machine address of the received extended communication address map, wherein the communication address map of the own machine is not changed, and when there are two unconfirmed addresses of the extended communication address map of the own machine, the transmitter/receiver executes the above operations with respect to one of the two unconfirmed addresses; condition 10: a transmitter/receiver which has transmitted an extended communication address map and thereafter receives the extended communication address map confirms a termination address of the received extended communication address map, and if the termination address is equal to the own machine address, then the transmitter/receiver executes no process operation; condition 11: a transmitter/receiver which has transmitted an extended communication address map and thereafter receives the extended communication address map confirms a transmission address of the received extended communication address map if a termination address of the received extended communication address map is not equal to the own machine address, and when the own machine address is described in the transmission address, the transmitter/receiver describes the own machine of the received communication address map in the counter party address on which the unconfirmed address of the communication address map contained in the own machine is described, and further transmits an extended communication map using the changed communication address map to the own machine address of the received communication address, transmits to a transmitter/receiver described in the termination address map of the own machine, such a termination address of the received extended communication address map after having transmitted the extended communication mpa, and thereafter, changes the termination address map into the own machine address, wherein when there are two unconfirmed addresses of the extended communication address map of the own machine, the transmitter/receiver executes the above operations with respect to one of the two unconfirmed addresses; condition 12: a transmitter/receiver which has received a termination address changes the content of the termination address map of the own machine into the received termination address; condition 13: a transmitter/receiver that after the extended communication address map has been received, the extended communication address map is transmitted, and then again receives the extended communication address map compares the received extended communication address map with the previously-received extended communication address map, and executes no process operation when the extended communication address maps have the same contents with each other, whereas the transmitter/receiver follows the condition 11 when the extended communication address maps have different contents from each other; and condition 14: in a case that after having transmitted the communication address map, a transmitter/receiver does not receive a communication address map within a predetermined time period, the transmitter/receiver discards such information on which the transmission of the communication address map is recorded.

BRIEF DESCRIPTION OF THE DRAWINGS

FIG. 10 is a schematic diagram showing the communication address map and a termination address map of the embodiment 4.

FIG. 11 is a schematic diagram showing an extended communication address map of the embodiment 4.

FIG. 12 is an explanatory diagram for explaining a definition of the line-shaped transfer path of the embodiment 4.

DETAILED DESCRIPTION OF THE PREFERRED EMBODIMENTS

Figures 1, 2:
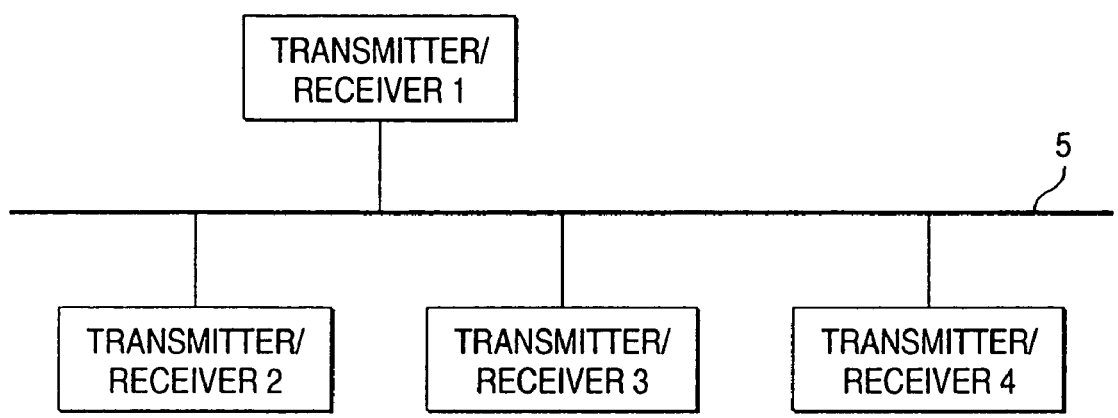
FIG. 1 is a schematic diagram showing a physical transfer path of a transmitter/receiver according to an embodiment 1 of the present invention.
FIG. 2 is a diagram showing a scheduled transfer destination database according to the embodiment 1.

Referring now to the drawings, embodiments of the present invention will be concretely described.

Embodiment 1

FIG. 1 is a schematic diagram showing a physical transfer path of respective transmitters/receivers according to an embodiment 1 of the present invention. Transmitters/receivers 1 to 4 are connected to a cable 5. While the respective transmitters/receivers 1 to 4 designate a transmitter/receiver functioning as a counter party by using the cable 5, the transmitters/receivers 1 to 4 can transmit/receive various sorts of data.

Each of the transmitters/receivers transmits/receives as a database both contents data and information as to a transmitter/receiver to which this contents data is scheduled to be transmitted. The contents data is defined as moving picture data, audio data, or graphic data. This database is indicated in FIG. 2. In this database, transmitters/receivers to which contents data is scheduled to be transferred (will be referred to as "data transfer destinations" hereinafter), and flags are represented in such a format that the respective data transfer destinations may correspond to the respective flags. The flag indicates as to whether or not the contents data has been transferred to each of the transmitters/receivers. A flag of "1" indicates that contents data has been received. A flag of "0"

indicates that contents data has not yet been received. A flag of "2" indicates that contents data is being transmitted or received.

When contents data is transmitted, each of the transmitters/receivers adds a database to this contents data and then transmits the database-added contents data. A transmitter/receiver which has firstly received a database saves this database into this transmitter/receiver (will be referred to as an "internal database" hereinafter) in correspondence with each of the contents data. Furthermore, this transmitter/receiver updates this internal database in accordance with a content of a database transmitted from another transmitter/receiver.

A description will now be made of operations executed when a transmitter/receiver transmits contents data.

A transmitter/receiver determines a transfer destination transmitter/receiver from data transfer destinations having internal databases in which flags are "0" by employing the random number, and updates the flag "0" of this transfer destination transmitter/receiver in the internal database to become the flag of "2". The transmitter/receiver forms a duplication of this internal database, and then transmits this duplicated database to the respective transmitters/receivers having either the flag of "1" or the flag of "2" saved in the internal database. After the duplicated database has been transmitted, the transmitter/receiver transmits the contents data to such a transfer destination transmitter/receiver (except for the own transmitter/receiver) corresponding to the flag "2".

A description will now be made of operations executed when a transmitter/receiver receives contents data.

Within an internal database of a transmitter/receiver which is receiving contents data, the flag of this transmitter/receiver becomes "2" (either under transmission or under reception). When the transmitter/receiver has accomplished the reception of the contents data, this transmitter/receiver updates the flag "2" of the data transfer destination in the internal database to become the flag of "1". This data transfer destination corresponds to the relevant transmitter/receiver. The transmitter/receiver forms a duplication of this internal database, and then transmits this duplicated database to the respective transmitters/receivers (except for the own transmitter/receiver) having either the flag of "1" or the flag of "2" saved in the internal database.

Next, a description will now be made of updating operation of an internal database in the case that a database of a transmitter/receiver is received.

A transmitter/receiver having an internal database has already received contents data, or is receiving contents data. As a result, a transmitter/receiver having probability to receive a database has an internal database.

Each of the transmitters/receivers saves a received database as a reception database. The transmitter/receiver compares the reception database with the internal database every data transfer destination. As to such a data transfer destination that a flag of the reception database is made coincident with a flag of the internal database, the transmitter/receiver does not perform the updating operation. As to such a data transfer destination that a flag contained in the internal database is "2" and a flag contained in the reception database is "1", the transmitter/receiver updates the relevant flag of the internal database by "1". As to such a data transfer destination that a flag contained in the internal database is "0" and a flag contained in the reception database is either "1" or "2", the transmitter/receiver updates the relevant flag contained in the internal database by "1" or "2". After the comparing operations and updating operations of the flags as to all of the data transfer destinations have been carried out, the transmitter/receiver discards the reception database. In such a case that while comparing the reception database with the internal database, the transmitter/receiver receives another database, the transmitter/receiver compares the first database with the internal database and updates flags, and thereafter compares the next database with the internal database and also updates flags.

Operations of a data transfer method of a transmitter/receiver having the above-explained database updating means will now be described.

Both contents data and a database of a transfer-scheduled transmitter/receiver are inputted into the transmitter/receiver 1. The database shown in FIG. 2 is such an internal database formed immediately after the contents data is entered into the transmitter/receiver 1. Since the transmitter/receiver 1 has already received the contents data, the flag corresponding to the transmitter/receiver 1 is "1", and flags of other transmitters/receivers are "0".

The transmitter/receiver 1 internally produces the random number, and selects one transfer destination transmitter/receiver having a flag of "0" from the transfer-scheduled database by utilizing this random number. For instance, it is now assumed that this transfer destination transmitter/receiver is the transmitter/receiver 2. After the transmitter/receiver 1 changes the flag corresponding to the transmitter/receiver 2 of the internal database into "2", this transmitter/receiver 1 transmits a duplication of the internal database and the contents data to the transmitter/receiver 2.

After the transmitter/receiver 2 receives a database, this transmitter/receiver 2 receives contents data, and then changes the flag of the transmitter/receiver 2 of the internal database into "1" after the reception of this contents data is completed. The transmitter/receiver 2 transmits a duplication of this internal database to the transmitter/receiver 1 attached with the flag "1". The transmitter/receiver 1 updates the internal database in such a manner that the flag of the transmitter/receiver 2 becomes "1".

Thereafter, the transmitter/receiver 1 internally produces the random number, and selects one transfer destination transmitter/receiver having a flag of "0" from the transfer-scheduled database by utilizing this random number. For instance, it is now assumed that this transfer destination transmitter/receiver is the transmitter/receiver 3. The transmitter/receiver 1 changes the flag corresponding to the transmitter/receiver 3 of the internal database into "2". At this time, such a transmitter/receiver that the flag is "1" in the internal database thereof is equal to both the transmitter/receiver 1 and the transmitter/receiver 2. As a result, this transmitter/receiver transmits a duplication of the internal database to the transmitter/receiver 2. Furthermore, this transmitter/receiver transmits the duplication of the internal database and the contents data to the transmitter/receiver 3.

The transmitter/receiver 2 receives the database sent from the transmitter/receiver 1 to thereby update the internal database. As a result, it is now assumed that as to the internal database of the transmitter/receiver 2, the flag of the transmitter/receiver 1 is "1"; the flag of the transmitter/receiver 2 is "1"; the flag of the transmitter/receive 3 is "2"; and the flag of the transmitter/receiver 4 is "0". At this time, the transmitter/receiver 2 selects the transmitter/receiver 4 as a transfer destination transmitter/receiver. This transmitter/receiver 2 updates the flag of the transmitter/receiver 4 within the internal database by "2", and transmits a duplication of the internal database to the transmitter/receiver 1, the transmitter/receiver 2, and the transmitter/receiver 3. In response to the received database, the transmitter/receiver 1, the transmitter/receiver 2, and the transmitter/receiver 3 update the flags of the transmitter/receiver 4 of the respective internal databases by "2".

It is now assumed that the reception by the transmitter/receiver 4 has been accomplished earlier than the reception of the transmitter/receiver 3. After the reception has been accomplished, the transmitter/receiver 4 updates the internal database, the flag of the transmitter/receiver 1 becomes "1"; the flag of the transmitter/receiver 2 becomes "1"; the flag of the transmitter/receiver 3 becomes "2"; and the flag of the transmitter/receiver 4 becomes "1". The transmitter/receiver 4 transmits a duplication of this internal database to the transmitter/receiver 1, the transmitter/receiver 2, and the transmitter/receiver 3. The respective transmitters/receivers update the flags of the transmitter/receiver 4 of the respective internal databases by "1".

When the reception by the transmitter/receiver 3 is accomplished, the transmitter/receiver 3 updates the internal database, the flag of the transmitter/receiver 1 becomes "1"; the flag of the transmitter/receiver 2 becomes "1"; the flag of the transmitter/receiver 3 becomes "1"; and the flag of the transmitter/receiver 4 becomes "1". The transmitter/receiver 3 transmits this internal database to the transmitter/receiver 1, the transmitter/receiver 2, and the transmitter/receiver 4. The respective transmitters/receivers update the flags of the transmitter/receiver 3 by "1". As a result, the respective flags of the databases of the respective transmitter/receivers become "1", so that the data transfer operation is completed.

In the data transfer method of the embodiment 1, the above-described database is investigated. At this time, it is possible to check that the contents data is transferred to which transmitter/receiver.

Also, when the contents data fails, the random number is produced, and a transmitter/receiver containing the above-explained database in which the flag is "1" is properly selected. The contents data is updated by transferring the relevant content data from the selected transmitter/receiver.

In the conventional client/server type data transfer method, since the data is duplicated by that the server manager transfers the data to the respective transmitters/receivers, or the client machine issues the data transfer request to the server machine, it is required to manage the data transfer operation. However, when the data transfer method according to the embodiment 1 is utilized, it is possible to automatically transfer the data in response to the data reception.

Embodiment 2

According to a data transfer method of embodiment 2 of the present invention, a database similar to that of the above-explained data transfer method according to embodiment 1 is added to contents data, and then the database-added contents data is transferred. A description will be made of an update sequence of an internal database and also a transfer sequence of contents data in embodiment 2.

Figure 3:
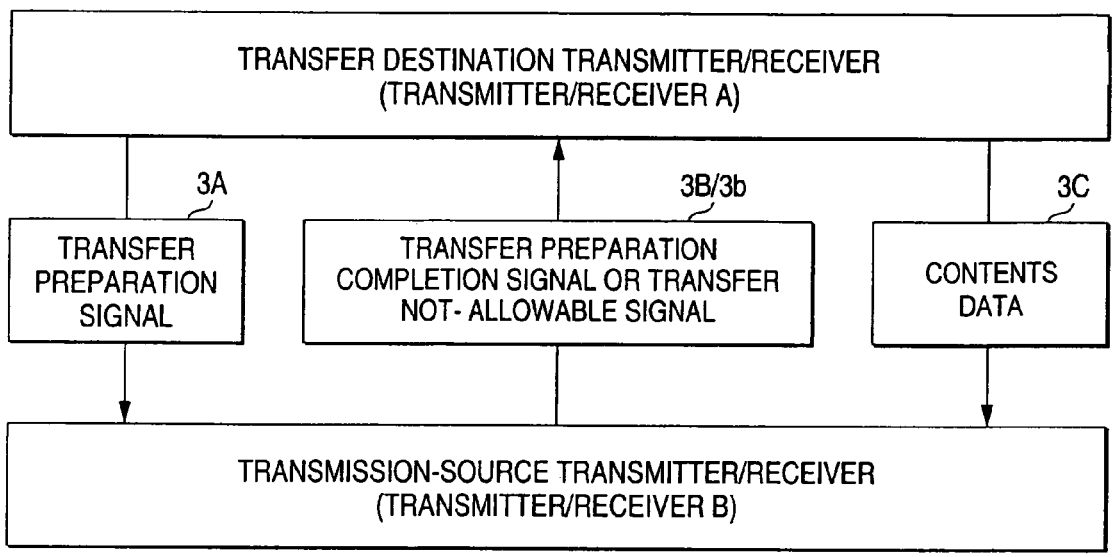
FIG. 3 is a diagram showing a transmission sequence of contents data by a transmitter/receiver according to an embodiment 2 of the present invention.

FIG. 3 is a diagram showing a transmission sequence of contents data by each of transmitters/receivers according to this embodiment 2.

When there is such a data transfer destination having an internal database in which a flag is "0", a transmitting transmitter/receiver commences a transmission of contents data. The transmitting transmitter/receiver (will be referred to as a "transmitter/receiver A" hereinafter) determines a scheduled transfer destination transmitter/receiver (will be referred to as a "transmitter/receiver B" hereinafter) by using the random number based upon the data transfer destinations of which flags are equal to "0" in the internal database. The transmitter/receiver A transmits to the transmitter/receiver B, a transfer preparation signal 3A containing information related to the contents data. When the transmitter/receiver B receives the transfer preparation signal 3A, this transmitting/receiver B calculates an entire load of process operations executed in this transmitter/receiver B so as to judge as to whether or not the contents data can be received and also the present process operation can be carried out. The transmitter/receiver B transmits a transfer preparation completion signal 3B to the transmitter/receiver A if the contents data can be received, whereas the transmitter/receiver B transmits a transfer not-allowable signal 3b if the contents data cannot be received.

Upon receipt of the transfer preparation completion signal 3B, the transmitter/receiver A updates a flag "0" of a data transfer destination of the internal database by "2", and this data transfer destination corresponds to the transmitter/receiver B. After this update operation, the transmitter/receiver A transmits a duplication of the internal database to the respective transmitters/receivers (except for the own transmitter/receiver) which have either a flag of "1" or a flag of "2" in the database. Thereafter, this transmitter/receiver A transmits contents data 3C.

Also, when the transmitter/receiver A receives the transfer not-allowable signal 3b, the transmitter/receiver A again determines a scheduled transfer destination transmitter/receiver by using the random number based upon the data transfer destinations except for the transmitter/receiver B of which the flags are "0" from the internal database. Then, the transmitter/receiver A transmits a transfer preparation signal to this scheduled transfer destination transmitter/receiver in a similar manner to the transmitter/receiver B, and then waits for the reception of either a transfer preparation completion signal or a transfer not-allowable signal. Operations of this transmitter/receiver A after receiving the signal are performed similarly to those of the transmitter/receiver B.

In such a case that the transmitter/receiver A receives the transfer not-allowable signals from all of the data transfer destinations of which the flags are "0" in the internal database, the transmitter/receiver A stops the process operation related to the data transfer operation for a predetermined time period. After the predetermined period has passed, this transmitter/receiver A newly determines a scheduled transfer destination transmitter/receiver by employing the random number, and then executes a similar process operation as in the transmitter/receiver B.

When the reception of the contents data is accomplished, the transmitter/receiver updates a flag "2" of a data transfer destination of the internal database by "1", and this data transfer destination corresponds to the relevant transmitter/receiver. After this update operation, the transmitter/receiver transmits a duplication of the internal database to the respective transmitters/receivers (except for the own transmitter/receiver) which have either a flag of "1" or a flag of "2" in the database.

Although the operator is required to manage the data transfer operation in the conventional data transfer method, if the data transfer method according to this embodiment 2 is utilized, then the data can be automatically transferred in response to the reception content of the data. Also, the data can be automatically transferred in response to the operation conditions of the respective transmitters/receivers.

Embodiment 3

Figure 4:
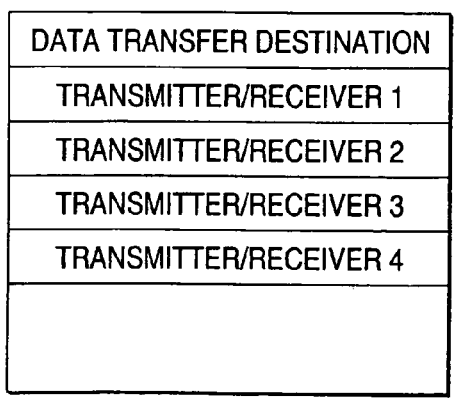
FIG. 4 is a diagram showing a scheduled transfer destination database according to an embodiment 3 of the present invention.

According to a data transfer method of embodiment 3 of the present invention, a physical transfer path similar to that of the above-described data transfer method according to embodiment 1 is provided, and a database is added to contents data, and then the database-added contents data is transferred. The database of this data transfer method contains such information used to specify a transmitter/receiver to which this contents data is scheduled to be transmitted. As indicated in FIG. 4, names of transmitters/receivers are described in this database.

Next, a description will now be made of an update sequence of a database and a transfer sequence of contents data in the data transfer method of the embodiment 3.

In a database just after this database is received, both a name of a received transmitter/receiver and a name of such a transmitter/receiver to which contents data is scheduled to be transferred are indicated. After the transmitter/receiver has received the database, this transmitter/receiver receives contents data. After the reception of this contents data is completed, the transmitter/receiver properly subdivides the database into two databases. It is now assumed that a database containing the name of the present transmitter/receiver (namely, the own transmitter/receiver name) is referred to as a database A1, and the remaining database is referred to as a database B1.

The present transmitter/receiver selects an arbitrary transmitter/receiver from the database B1, and then transmits the database B1 and the contents data to this arbitrarily selected transmitter/receiver. After this transmission is completed, the present transmitter/receiver deletes the database B1.

Thereafter, the present transmitter/receiver properly subdivides the database A1 into two databases. It is now assumed that a database containing the name of the present transmitter/receiver is referred to as a database A2, and the remaining database is referred to as a database B2. The present transmitter/receiver selects an arbitrary transmitter/receiver from the database B2, and then transmits the database B1 and the contents data to this arbitrarily selected transmitter/receiver. When such an operation is repeatedly carried out properly-selected times, a database An is brought into such a condition that only the name of the present transmitter/receiver is involved. At this time, the update operation of the database and the transmission operation of the contents data are stopped.

In the data transfer method of this embodiment 3, since a total number of these transmitters/receivers for transmitting the contents data is exponentially increased, the contents data can be transferred to a large number of transmitters/receivers in a high efficiency. It should be noted that although the database is subdivided into the two databases in this embodiment 3, a similar effect may be achieved when the database is subdivided into 2 or more databases.

Although the operator is required to manage the data transfer operation in the conventional data transfer method, if the data transfer method according to this embodiment 3 is utilized, then the data can be automatically transferred in response to the reception content of the data. Also, in such a data transfer method, since data is transferred from one transmitter/receiver to a plurality of transmitters/receivers, the data transfer completing time required to transfer the data to all of the transmitters/receivers can be reduced.

Embodiment 4

Next, embodiment 4 of the present invention will be explained. According to embodiment 4, transmitters/receivers each have an internal address so as to specify a transmitting/receiving unit. This internal address is set in such a manner that this internal address is not duplicated, or repeated with respect to internal addresses of all of the transmitters/receivers which perform data communications. Based on this internal address, a transmitter/receiver is designated so as to perform a data communication.

Figures 5, 6:
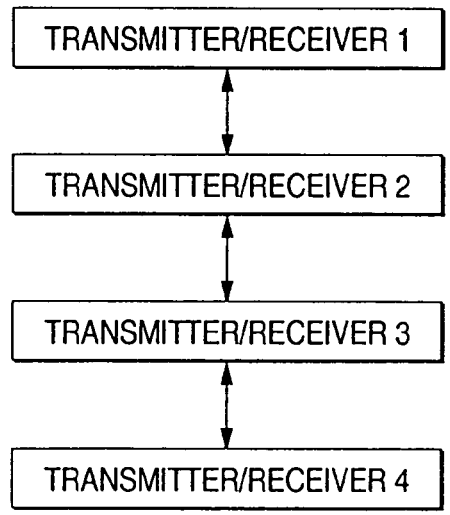
FIG. 5 is a diagram showing a content of a communication address map according to an embodiment 4 of the present invention.
FIG. 6 is a diagram showing a line-shaped transfer path of the embodiment 4.

To explain embodiment 4, a description will now be made of a communication address map stored by each of the transmitters/receivers. FIG. 5 shows a schematic diagram of this communication address map. The communication address map contains an internal address of a transmitter/receiver, and a counter party address used to specify a transmitter/receiver of a counter party to which a data communication is carried out. The communication address map can store thereinto two sets of counter party addresses at a maximum.

In an example of FIG. 5, as the counter party address, both an address of a transmitter/receiver A and an address of a transmitter/receiver B are saved. A transmitter/receiver having such a communication address map executes a data communication only with the transmitter A and the transmitter B.

In the case that a data communication counter party is not yet confirmed, an unconfirmed address is set to a counter party address of a communication address map. This unconfirmed address indicates an unconfirmed counter party. When an unconfirmed address is set, a transmitter/receiver performs a data communication with all of the transmitters/receivers.

To explain this embodiment, a line-shaped transfer path and a loop-shaped transfer path will now be described.

The line-shaped transfer path will be explained with reference to FIG. 6. In FIG. 6, a transmitter/receiver 1 executes a data communication with a transmitter/receiver 2. The transmitter/receiver 2 executes a data communication with the transmitter/receiver 1 and a transmitter/receiver 3. The transmitter/receiver 3 executes a data communication with the transmitter/receiver 2 and a transmitter/receiver 4. The transmitter/receiver 4 executes a data communication with the transmitter/receiver 3. While setting the transmitter/receiver 1 as a starting point, when data-communicatable transmitters/receivers are arranged, the transmitter/receiver 1; the transmitter/receiver 2; the transmitter/receiver 3; and the transmitter/receiver 4 can be arranged in this order. When the data communication is commenced from the transmitter/receiver 1, the data communication can be carried out from this transmitter/receiver 1 to the transmitter/receiver 2, and furthermore, to the transmitter/receiver 3, and the transmitter/receiver 4 in this order.

As explained above, a transfer path of a data communication will be referred to as a "line-shaped transfer path". In this line-shaped transfer path, while a certain transmitter/receiver is set as a starting point, a transmitter/receiver which receives data transmits the data to the next transmitter/receiver, and then, the data communication is ended at a certain transmitter/receiver. Also, a total number of transmitters/receivers which participate in this line-shaped transfer path will be referred to as "a length of the line-shaped transfer path".

Figure 7:
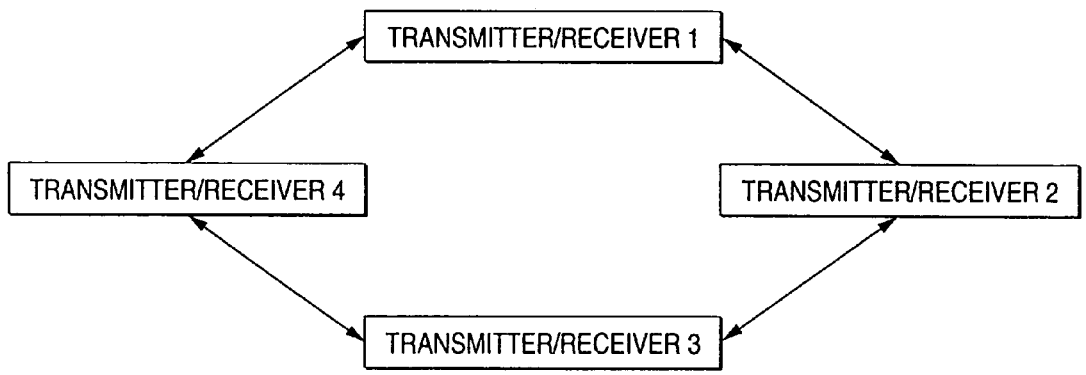
FIG. 7 is a diagram showing a loop-shaped transfer path of the embodiment 4.

The loop-shaped transfer path will be explained with reference to FIG. 7. In FIG. 7, a transmitter/receiver 1 executes a data communication with a transmitter/receiver 2 and a transmitter/receiver 4. The transmitter/receiver 2 executes a data communication with the transmitter/receiver 1 and a transmitter/receiver 3. The transmitter/receiver 3 executes a data communication with the transmitter/receiver 2 and the transmitter 4. The transmitter/receiver 4 executes a data communication with the transmitter/receiver 3 and also the transmitter/receiver 1. When data-communicatable transmitters/receivers are arranged, the transmitter/receiver 1; the transmitter/receiver 2; the transmitter/receiver 3; and the transmitter/receiver 4 are arranged in this order, and then, the loop is again returned to the transmitter/receiver 1.

As explained above, a transfer path of a data communication will be referred to as a "loop-shaped transfer path". That is, in this loop-shaped transfer path, while arbitrary transmitter/receiver is set as a starting point, a data transmission is commenced. When a transmitter/receiver which receives data transmits data to the next transmitter/receiver, the data is returned to the transmitter/receiver provided at the starting point. Also, a total number of transmitters/receivers which participate in this loop-shaped transfer path will be referred to as "a length of the loop-shaped transfer path".

Figure 8:
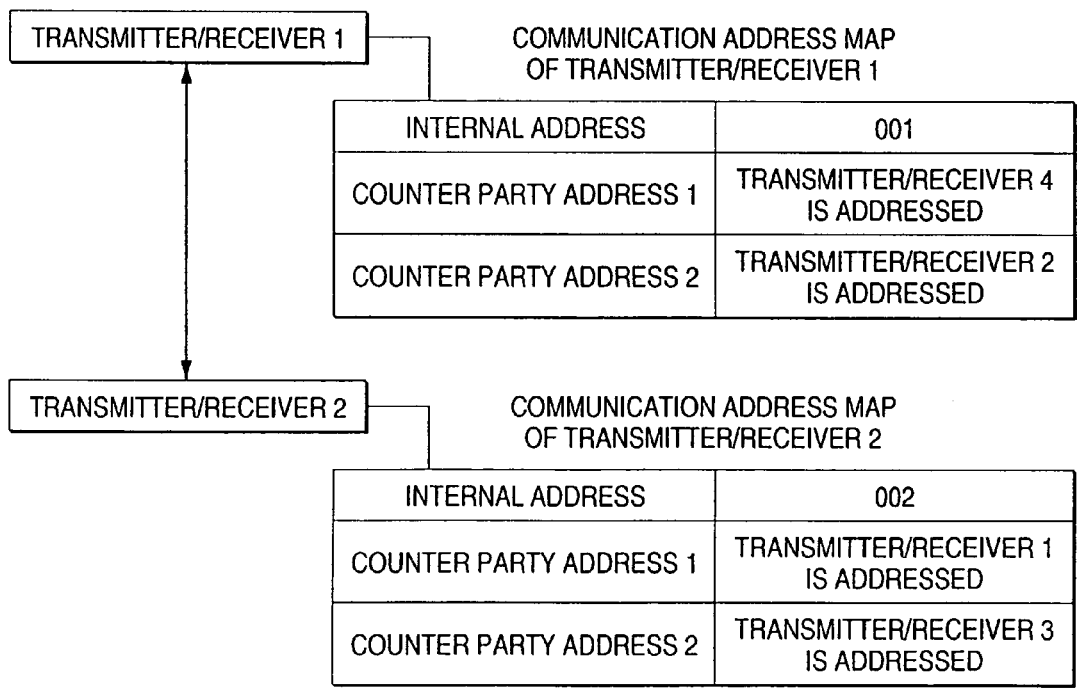
FIG. 8 is a diagram showing a feature of a communication address map of the embodiment 4.

Referring now to FIG. 8, a description will be made of a communication of a transmitter/receiver while using a communication address map.

As shown in FIG. 8, in the case that one address contained in the communication address map of the transmitter/receiver 1 addresses the transmitter/receiver 2, one address contained in the communication address map of the transmitter/receiver 2 addresses the transmitter/receiver 1. As described above, when the addresses for mutually addressing the transmitters/receivers are designated in both the communication address maps, the data communication can be performed.

When a transmitter/receiver receives data from another transmitter/receiver, the first-mentioned transmitter/receiver transmits this data to another transmitter/receiver of a counter party address, which is different from the transmitter/receiver which receives the data by using the communication address of the relevant transmitter/receiver. For instance, when the transmitter/receiver 1 receives the data from the transmitter/receiver 4, this transmitter/receiver 1 transmits the data to the transmitter/receiver 2. Since the transmitter/receiver 2 receives the data from the transmitter/receiver 1, this transmitter/receiver 2 transmits the data to the transmitter/receiver 3.

Next, referring to FIG. 9, a description will be made of an alignment of transmitters/receivers with employment of a communication address map in a set of transmitters/receivers capable of performing data communications. A selection is made of an arbitrary transmitter/receiver which executes data communication. This arbitrary transmitter/receiver is assumed as a transmitter/receiver A. While observing the communication address map of this transmitter/receiver A, data-communicatable transmitters/receivers are arranged vertically. These data-communicatable transmitters/receivers are assumed as a transmitter/receiver B and a transmitter/receiver C. When data-communicatable transmitters/receivers are arranged in such a manner that these transmitters/receivers are located in contact with each other, the transmitter/receiver B; the transmitter/receiver A; and the transmitter/receiver C are arranged in this order.

Since these transmitters/receivers B and C perform the data communication with the transmitter/receiver A, one of the counter party addresses contained in the communication address maps of the transmitter/receiver B and the transmitter/receiver C addresses the transmitter/receiver A. The transmitters/receivers which are addressed by the counter party addresses of these communication address maps and are not addressed by the transmitter/receiver A are assumed as a transmitter/receiver D and a transmitter/receiver E. When the data-communicatable transmitters/receivers are arranged in such a manner that these transmitters/receivers are located in contact with each other, the transmitter/receiver D; the transmitter/receiver B; the transmitter/receiver A; the transmitter/receiver C; and the transmitter/receiver E are arranged in this order.

As explained above, the arrangement for arranging the communicatable transmitters/receivers in contact with each other will be referred to as an alignment of transmitters/receivers with employment of a communication address map, or simply referred to as an alignment of transmitters/receivers.

Figure 9:
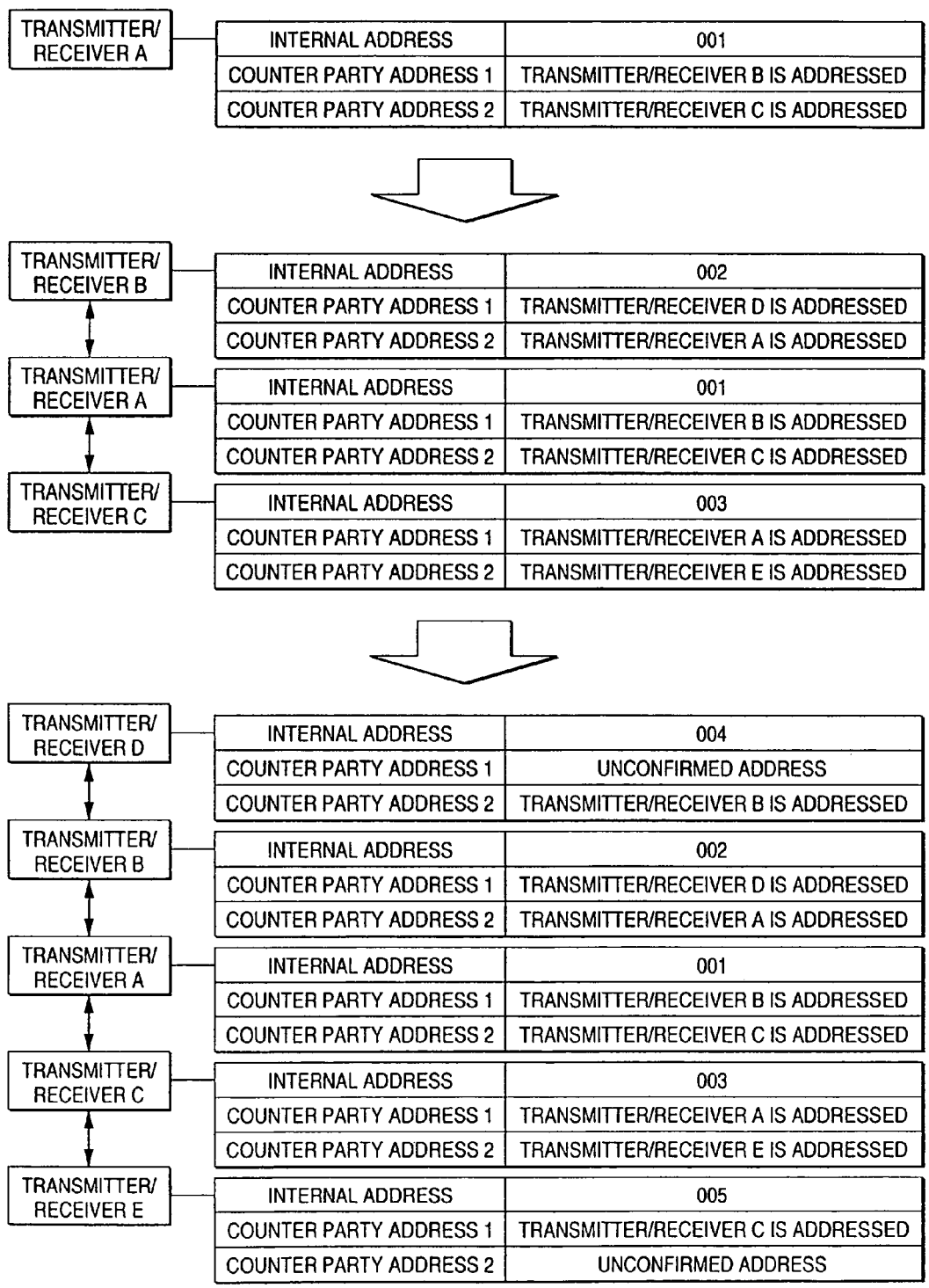
FIG. 9 is a diagram showing another feature of the communication address map of the embodiment 4.

In FIG. 9, a counter party address of a communication address map contained in a transmitter/receiver D is both an address for addressing a transmitter/receiver B and an unconfirmed address. As explained above, if there is a transmitter/receiver containing a communication address map having an unconfirmed address, then communicatable transmitters/receivers cannot be continuously arranged. This state will be referred to as a state under which an alignment of transmitters/receivers is stopped by an unconfirmed address.

An arbitrary transmitter/receiver is selected from a set of transmitters/receivers capable of communicating data, and then, this selected transmitter/receiver is assumed as a transmitter/receiver A. An alignment is commenced from this transmitter/receiver A. At this time, the set of transmitters/receivers is subdivided into a set of transmitters/receivers (aligned set) which are aligned from the transmitter/receiver A, and also a remaining set (unaligned set). While the transmitters/receivers are aligned, when the communication address map is observed so as to execute the next transmitter/receiver alignment, one of the counter party addresses is equal to such an address for addressing a transmitter/receiver involved in the set of aligned transmitters/receivers, whereas the other of the counter party addresses is equal to any one of an address for addressing the aligned set of transmitters/receivers, another address for addressing the unaligned set of transmitters/receivers, and an unconfirmed address. How to continue the alignment of transmitters/receivers in the respective cases will now be explained.

In the case that the counter party address of the communication address map of the transmitter/receiver addresses the unaligned set of transmitters/receivers, the relevant transmitter/receiver is involved in the aligned set, and the next alignment is carried out by using the communication address map of the transmitter/receiver indicated by the counter party address.

In the case that the counter party address of the communication address map of the transmitter/receiver is the unconfirmed address, the alignment along one alignment direction commenced from the transmitter/receiver A is stopped. In this case, the alignment along the other direction is continuously carried out.

Next, a description will now be made of such a case that the counter party address of the communication address map owned by the transmitter/receiver addresses the aligned set of transmitters/receivers. The alignment direction as to the aligned set of transmitters/receivers corresponds to two directions. The transmitters/receivers involved in the aligned set are mutually addressed with each other except for one counter party address of the communication address maps contained in two transmitters/receivers which are aligned. As a consequence, when the counter party address addresses the aligned set of transmitters/receivers, the addressed transmitters/receivers correspond to such transmitters/receivers which are aligned along the other direction. Such a state will be referred to as a state under which a communication address map defines a loop-shaped transfer path.

Also, such a case that transmitters/receivers are aligned from such a transmitter/receiver having a communication address map in which one counter party address is equal to an unconfirmed address, and then, another transmitter/receiver having a communication address map in which one counter party address is equal to an unconfirmed address is finally confirmed, will be referred to as a state under which a line-shaped transfer path is confirmed by a communication address map.

More specifically, when both counter party addresses of communication address maps contained in a transmitter/receiver are equal to unconfirmed addresses, this state will be referred to as such a fact that the communication address map confirms a line-shaped transmission path having a length of 1.

In the case that all of the transmitters/receivers perform data communications, when two transmitters/receivers among all of these transmitters/receivers have the communication address maps in which one counter party address is an unconfirmed address and no unconfirmed address appears in the communication address maps of other transmitters/receivers, the communication address maps confirm the line-shaped transfer path.

In an actual case, when the alignment of the transmitters/receivers is commenced while setting such a transmitter/receiver having an unconfirmed address of a communication address map as a head, the alignment of these transmitters/receivers is advanced along one direction. At this time, an address of a transmitter/receiver addressed by the communication address maps of the transmitters/receivers under alignment is equal to either an address for addressing an unaligned set of transmitters/receivers or an unconfirmed address. When this address is equal to the address for addressing the unaligned set of transmitters/receivers, the alignment of these transmitters/receivers is continued. When this address is equal to the unconfirmed address, the line-shaped transfer path is confirmed.

In such a case that an unaligned set is present after the communication address map has confirmed the line-shaped transfer path, this unaligned set is constituted by such transmitters/receivers having communication address maps used to confirm a plurality of loop-shaped transfer paths. Actually, an arbitrary transmitter/receiver is selected from this unaligned set. At this time, the counter party address of the communication address map of the relevant transmitter/receiver addresses the unaligned set of transmitters/receivers except for this relevant transmitter/receiver. While using this relevant transmitter/receiver as a starting point, and both the aligned set and the unaligned set of transmitters/receivers are formed, the alignment of the transmitters/receivers is carried out.

An address of a communication address map owned by a transmitter/receiver under alignment addresses either an aligned set of transmitters/receivers or an unaligned set of transmitters/receivers. When this address addresses the aligned set of transmitters/receivers, the loop-shaped transfer path is confirmed. When this address addresses the unaligned set of transmitters/receivers, the alignment of the transmitters/receivers is continued.

When the loop-shaped transfer path is confirmed, an arbitrary transmitter/receiver is selected from the remaining unaligned set, and the alignment of the transmitters/receivers is continued.

When the unaligned set becomes an empty set, since the addresses of the communication address maps owned by the transmitters/receivers which are continuously aligned address the aligned set of transmitters/receivers, the loop-shaped transfer path is defined.

Next, a description of a termination in a set of transmitters/receivers which confirm a line-shaped transfer path. In this set of transmitters/receivers, there are two transmitters/receivers containing communication address maps having one unconfirmed address. These transmitters/receivers are assumed as a transmitter/receiver A and another transmitter/receiver B.

When the transmitters/receivers are aligned while setting the transmitter/receiver A as a head, the transmitter/receiver B is finally added to the alignment, and then, the alignment is accomplished. This state will be referred to as such a state that the termination of the line-shaped transfer path while setting the transmitter/receiver A as the head is equal to the transmitter/receiver B. Also, when the transmitters/receivers are aligned while setting the transmitter/receiver B as a head, the transmitter/receiver A is finally added to the alignment, and then, the alignment is accomplished. This state will be referred to as such a state that the termination of the line-shaped transfer path while setting the transmitter/receiver B as the head is equal to the transmitter/receiver A.

As described above, in the set of transmitters/receivers which have confirmed the line-shaped transfer path, when the alignment of the transmitters/receivers is commenced while setting as the head such a transmitter/receiver containing the communication address map having the unconfirmed address, the transmitter/receiver which constitutes the termination may be uniquely determined. The address of this transmitter/receiver which constitutes the termination will be referred to as a termination address of a transmitter/receiver containing a communication map having an unconfirmed address.

In the set of transmitters/receivers which have confirmed the line-shaped transfer path, the transmitter/receiver containing the communication address map having the unconfirmed address owns a termination address.

As a result, as shown in FIG. 10, a termination address map attached to the communication address map is added, and then the below-mentioned data is saved in this termination address map.

In such a transmitter/receiver containing a communication address map having an unconfirmed address about a set of transmitters/receivers which have confirmed a line-shaped transfer path, a termination address is saved in a termination address map.

In the case that both two counter party addresses of a communication address map are equal to addresses indicative of a transmitter/receiver, an address of the own transmitter/receiver is saved in a termination address map. In the case that both two counter party addresses of a communication address map are equal to unconfirmed addresses, an address of the own transmitter/receiver is saved.

Since such a termination address map is always attached to the communication address map, this termination address map can be incorporated into a portion of the communication address map. This state is illustrated in FIG. 11. Into this communication address map, the address of the own transmitter/receiver; the two counter party addresses; and also the termination address are stored. This communication address map will be referred to as an extended communication address map.

The terminologies used in this embodiment have been so far explained.

Subsequently, operations of the respective transmitters/receivers in this embodiment 4 of the present invention will now be explained.

In each of the transmitters/receivers, the below-mentioned 14 sorts of algorithms (A1 to A14) are defined as to the communication address map.

(A1): Under initial state of the transmitter/receiver, the communication address map includes two unconfirmed addresses.

(A2): The transmitter/receiver transmits the communication map in a constant time interval with respect to the transmitter/receiver addressed by the counter party address of the communication address map.

(A3): In the case that the own machine address of the communication address map is present in the counter party address of the communication address map of the own machine, the transmitter/receiver which has received the communication address map transmits a signal used to indicate presence containing the address information of the own machine (will be referred to as a "presence confirmation signal" hereinafter) to the transmitter/receiver addressed by the own machine address of the received communication address map.

(A4): In the case that the own machine address of the communication address map is not present in the counter party address of the communication address map of the own machine, the transmitter/receiver which has received the communication address map changes the two counter party addresses of the own machine into the unconfirmed addresses, and also changes the termination address into the own machine address.

(A5): After the communication address map has been sent, such a transmitter/receiver executes no process operation, which has received the presence confirmation signals derived from all of the transmitters/receivers addressed by the counter party address, which has transmitted the communication address map within a predetermined time period.

(A6): After the communication address map has been sent, such a transmitter/receiver executes the following address changes, which has not yet received the presence confirmation signals derived from all of the transmitters/receivers addressed by the counter party address, which has transmitted the communication address map within a predetermined time period. That is, this transmitter/receiver changes the two counter party addresses of the own machine into the unconfirmed addresses, and also changes the termination address into the own machine address.

(A7): The transmitter/receiver having the unconfirmed address is brought into a waiting state for a constant time period by using the random number, and thereafter transmits the extended communication address map contained in the own machine to all of the transmitters/receivers.

(A8): When the transmitter/receiver having the confirmed address in the communication address map receives the extended communication address map, this transmitter/receiver executes no process operation.

(A9): In the case that the transmitter/receiver having the unconfirmed address in the communication address map receives the extended communication address map, this transmitter/receiver writes the own machine address of the received communication address map into the counter party address on which the unconfirmed address of the extended communication address map of the own machine has been superimposed. Then, this transmitter/receiver transmits the extended communication address map to the own machine address of the received extended communication address map. At this time, the transmitter/receiver does not change the communication address map of the own machine.

When there are two unconfirmed addresses in the extended communication address map of the own machine, the transmitter/receiver executes the above-described operations with respect to one of these unconfirmed addresses.

(A10): The transmitter/receiver which has transmitted the extended communication address map and thereafter has received the extended communication address map confirms the termination address of the received extended communication address map, and executes no process operation if this termination address is equal to the address of the own machine.

(A11): The transmitter/receiver which has transmitted the extended communication address map and thereafter has received the extended communication address confirms the transmission address of the received extended communication address map in such a case that the termination address of the received extended communication address map is not equal to the own machine address. When the own machine address is written, this transmitter/receiver writes the own machine of the received communication address map into the counter party address on which the unconfirmed address of the communication address map contained in the own machine has been superimposed. The transmitter/receiver transmits the extended communication address map using the changed communication address map to the own machine address of the received communication address map. After the extended communication address map has been transmitted, the termination address of the received extended communication address map is transmitted to such a transmitter/receiver written into the termination address map of the own machine. After the termination address has been transmitted, the termination address map is changed into the own machine address.

When there are two unconfirmed addresses of the extended communication address map of the own machine, the above-described operations are performed with respect to one of these unconfirmed addresses.

(A12): The transmitter/receiver which has received the termination address changes the content of the termination address map of the own machine into the received termination address.

(A13): The transmitter/receiver which has received the extended communication address map, thereafter has transmitted the extended communication address map, and again has received the extended communication address map, compares this extended communication address map with the previously received extended communication address map. When the compared extended communication address maps are identical to each other, this transmitter/receiver executes no process operation. To the contrary, when the compared extended communication address maps are different from each other, the transmitter/receiver is operated in accordance with the algorithm defined by (A11).

(A14): In the case that after the communication address map has been transmitted, the transmitter/receiver does not receive the communication address map within a determined time period, this transmitter/receiver discards the information which saves such a fact that the communication address map has been transmitted.

The set of such transmitters/receivers having the communication address map in which 14 sorts of algorithms are defined may define the line-shaped transfer path after a preselected time period has passed. Also, no loop-shaped transfer path is provided in this set. A description will now be made of an example of such a state that the line-shaped transfer path is defined.

FIG. 12 represents such a state that a transmitter/receiver A and a transmitter/receiver B are connected to a physical transfer path. Under an initial state, all of counter party addresses of the communication address map contained in the two transmitters/receivers are unconfirmed addresses. In this embodiment, the unconfirmed address is indicated by "FF". The own machine address of the transmitter/receiver A is "01", and the termination address thereof is also "01". The own machine address of the transmitter/receiver B is "02", and the termination address thereof is also "02".

In accordance with the algorithm (A7), the transmitter/receiver A transmits the communication address map of the own machine to the transmitter/receiver B.

In accordance with the algorithm (A9), the transmitter/receiver B changes one counter party address of the extended communication address map of the own machine into "01", and then transmits the changed counter party address to the transmitter/receiver A. As to this extended communication address map, the own machine address is "02"; the counter party address 1 is "01"; the counter party address 2 is "FF"; and further the termination address is "02".

Figure 13:
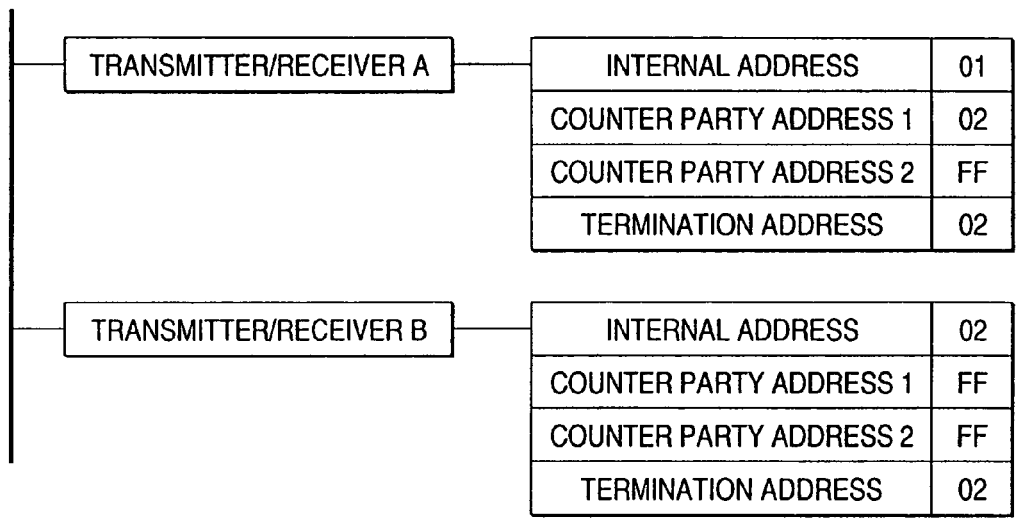
FIG. 13 is an explanatory diagram for explaining the definition of the line-shaped transfer path of the embodiment 4.

In accordance with the algorithm (A11), the transmitter/receiver A which has received the extended address map changes the counter party address 1 of the communication address map into "02". This changed extended communication address map is transmitted to the transmitter/receiver B. As to this extended communication address map, the own machine address is "01"; the counter party address 1 is "02"; the counter party address 2 is "FF"; and further the termination address is "01". After the changed extended communication address map has been transmitted to the transmitter/receiver B, the transmitter/receiver A transmits the termination address to be changed into "02" to the transmitter/receiver A, namely the own machine. After this transmission of the changed extended communication address map, the transmitter/receiver A updates the termination address by the own machine address. However, since the termination address is already the own machine address, no update operation is carried out. Upon receipt of the termination address, the transmitter/receiver A changes the termination address thereof into "02" in accordance with the algorithm (A12). This state is indicated in FIG. 13.

A series of operations related to the termination address is carried out in accordance with the above-explained sequential operation in such a case that both the two counter party addresses are the unconfirmed addresses. As a consequence, in the case of such a transmitter/receiver where both the counter party addresses are equal to the unconfirmed addresses, the termination address of the own machine may be changed into the termination address of the received extended communication address instead of transmitting the termination address of the received extended communication address map to the own machine.

Upon receipt of the above-explained extended communication address map, in accordance with the algorithm (A11), the transmitter/receiver B changes the counter party address 1 of the communication address map in to "01". This changed extended communication address map is transmitted to the transmitter/receiver A. As to this extended communication address map, the own machine address is "02"; the counter party address 1 is "01"; the counter party address 2 is "FF"; and further the termination address is "02". After the changed extended communication address map has been transmitted to the transmitter/receiver B, the transmitter/receiver B transmits the termination address to be changed into "02" to the transmitter/receiver B, namely the own machine. In accordance with the algorithm (A12), the termination address of the transmitter/receiver A is changed into "01".

When the transmitter/receiver A receives the extended communication address map sent from the transmitter/receiver B, this transmitter/receiver A executes no process operation in accordance with the algorithm (A13). This state is indicated in FIG. 14.

Under this state, the update operation of the communication address map is accomplished.

Figure 14:
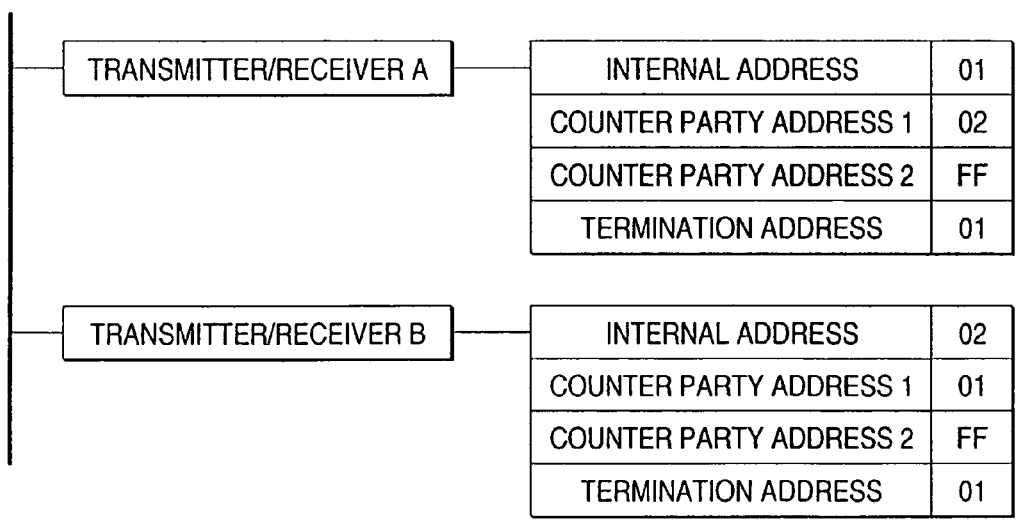
FIG. 14 is an explanatory diagram for explaining the definition of the line-shaped transfer path of the embodiment 4.

When a preselected time period has passed under the above-described state of FIG. 14, the transmitter/receiver A transmits the communication address map of the own machine to the transmitter/receiver B in accordance with the algorithm (A7).

In accordance with the algorithm (A9), the transmitter/receiver B changes the unconfirmed address of the extended communication address map of the own machine into "01", and then transmits the changed unconfirmed address to the transmitter/receiver A. As to this extended communication address map, the own machine address is "02"; the counter party address 1 is "01"; the counter party address 2 is "01"; and further the termination addresses "01".

In accordance with the algorithm (A10), the transmitter/receiver A which has received the extended communication address map sent from the transmitter/receiver B executes no process operation.

As a result, the state shown in FIG. 14 is not changed.

Figure 15:
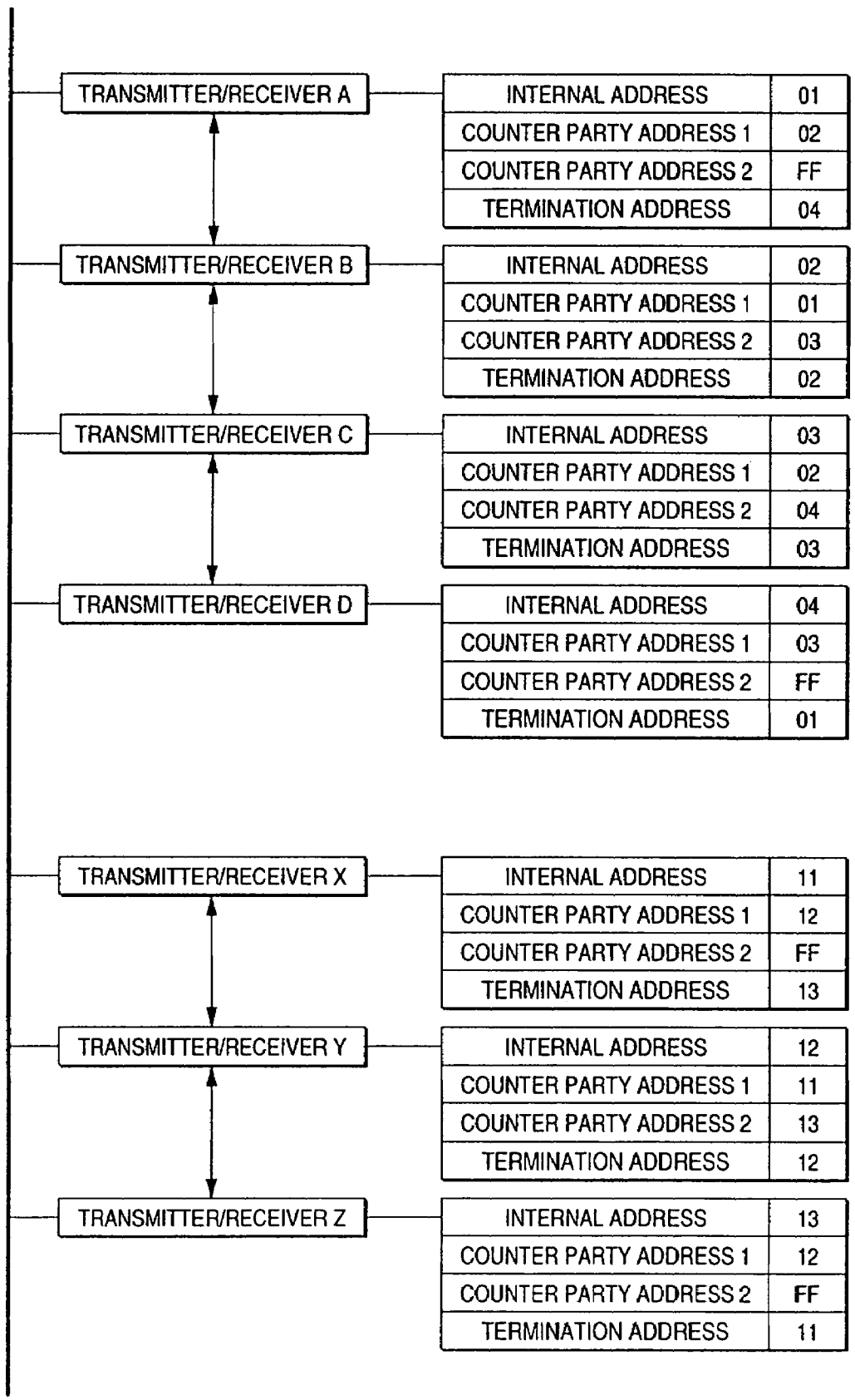
FIG. 15 is an explanatory diagram for explaining an example of the definition of the line-shaped transfer path of the embodiment 4.

A description will now be made of another example. It is now assumed that a plurality of transmitters/receivers connected to a physical transfer path define two line-shaped transfer paths. As indicated in FIG. 15, it is again assumed that these two line-shaped transfer paths are equal to a line-shaped transfer path having a length of 4, and another line-shaped transfer path having a length of 3. The line-shaped transfer path having the length of 4 is referred to as a "line-shaped transfer path A", and the line-shaped transfer path having the length of 3 is referred to as a "line-shaped transfer path X".

The line-shaped transfer path A is constituted by the transmitter/receiver A, the transmitter/receiver B, the transmitter/receiver C, and the transmitter/receiver D in the order of the alignment. As to the extended communication address maps of these transmitters/receivers, the following addresses are defined: As to the transmitter/receiver A, the own machine address is "01"; the counter party address 1 is "02"; the counter party address 2 is an unconfirmed address "FF"; and the termination address is "04" As to the transmitter/receiver B, the own machine address is "02"; the counter party address 1 is "01"; the counter party address 2 is "03"; and the termination address is "02". As to the transmitter/receiver C, the own machine address is "03"; the counter party address 1 is "02"; the counter party address 2 is "04" and the termination address is "03". As to the transmitter/receiver D, the own machine address is "04"; the counter party address 1 is "03"; the counter party address 2 is an unconfirmed address "FF"; and the termination address is "01".

The line-shaped transfer path X is constituted by the transmitter/receiver X, the transmitter/receiver Y, and the transmitter/receiver Z in the order of the alignment. As to the extended communication address maps of these transmitters/receivers, the following addresses are defined: As to the transmitter/receiver X, the own machine address is "11"; the counter party address 1 is "12"; the counter party address 2 is an unconfirmed address "FF"; and the termination address is "13". As to the transmitter/receiver Y, the own machine address is "12"; the counter party address 1 is "11"; the counter party address 2 is "13"; and the termination address is "12". As to the transmitter/receiver Z, the own machine address is "13"; the counter party address 1 is "12"; the counter party address 2 is an unconfirmed address "FF"; and the termination address is "11".

After a predetermined time period has passed, the transmitter/receiver A transmits the communication address map of the own machine to all of the transmitters/receivers in accordance with the algorithm (A7).

In accordance with the algorithm (A8), the transmitter/receiver B; the transmitter/receiver C; and the transmitter/receiver Y execute no process operation.

In accordance with the algorithm (A9), the transmitter/receiver D; the transmitter/receiver X; and also the transmitter/receiver Z transmit the extended communication address maps to the transmitter/receiver A. In this embodiment, it is now assumed that these extended communication address maps are transmitted from the transmitter/receiver D; the transmitter/receiver X, and the transmitter/receiver Z in this order.

As to the extended communication address map transmitted by the transmitter/receiver D, the own machine address is "04"; the counter party address 1 is "03"; the counter party address 2 is "01"; and the termination address is "01". The transmitter/receiver A which has received this extended communication address map executes no process operation in accordance with the algorithm (A10).

As to the extended communication address map transmitted by the transmitter/receiver X, the own machine address is "11"; the counter party address 1 is "12"; the counter party address 2 is "01"; and the termination address is "01".

In accordance with the algorithm (A11), the transmitter/receiver A which has received the extended communication address map transmitted by the transmitter/receiver X changes the extended communication address map of the own machine. As to the changed extended communication address map of this transmitter/receiver A, the own machine address is "01"; the counter party address 1 is "02"; the counter party address 2 is "11"; and the termination address is "04". The transmitter/receiver A transmits this changed extended communication address map to the transmitter/receiver X. After this map transmission, the transmitter/receiver A transmits an address "13" of the termination address of this received extended communication address map to the transmitter/receiver D of the termination address of the own machine. After the transmitter/receiver A has transmitted the termination address, this transmitter/receiver A changes the termination address of the own machine into the address "01" of the own machine. As a result, as to the extended communication address map of the transmitter/receiver A, the own machine address is "01"; the counter party address 1 is "02"; the counter party address 2 is "11"; and the termination address is "01".

Under this state, the transmitter/receiver A receives the extended communication address map in the order of the transmitter/receiver Z. At this time, since the unconfirmed address is not present in the extended communication address map of the transmitter/receiver A, this transmitter/receiver A executes no process operation in accordance with the algorithm (A8).

In accordance with the algorithm (A11), the transmitter/receiver X which has received the extended communication address map transmitted by the transmitter/receiver A changes the extended communication address map of the own machine. As to the changed extended communication address map of this transmitter/receiver X, the own machine address is "11"; the counter party address 1 is "12"; the counter party address 2 is "01"; and the termination address is "13". The transmitter/receiver X transmits this changed extended communication address map to the transmitter/receiver A. After this map transmission, the transmitter/receiver X transmits an address "04" of the termination address of this received extended communication address map to the transmitter/receiver Z of the termination address of the own machine. After the transmitter/receiver A has transmitted the termination address, this transmitter/receiver X changes the termination address of the own machine into the address "11" of the own machine. As a result, as to the extended communication address map of the transmitter/receiver X, the own machine address is "11"; the counter party address 1 is "12"; the counter party address 2 is "01"; and the termination address is "11".

The transmitter/receiver D which has received the termination address "13" transmitted from the transmitter/receiver A changes the termination address of the own machine into "13" in accordance with the algorithm (A12).

The transmitter/receiver A which has received the extended communication address map which was again transmitted by the transmitter/receiver X executes no process operation in accordance with the algorithm (A13).

The transmitter/receiver Z which has received the termination address "04" transmitted from the transmitter/receiver X changes the termination address of the own machine into "04" in accordance with the algorithm (A12).

Under this state, the update operations of the extended communication address map in the respective transmitters/receivers are accomplished which are commenced by transmitting the extended communication address map of the transmitter/receiver A. This state is indicated in FIG. 16.

This entire transmitter/receiver can be aligned while positioning the transmitter/receiver D at the head. When the entire transmitter/receiver is aligned, there are the transmitter/receiver D; the transmitter/receiver C; the transmitter/receiver B; the transmitter/receiver A; the transmitter/receiver X; the transmitter/receiver Y; and the transmitter/receiver Z in this order.

Figure 16:
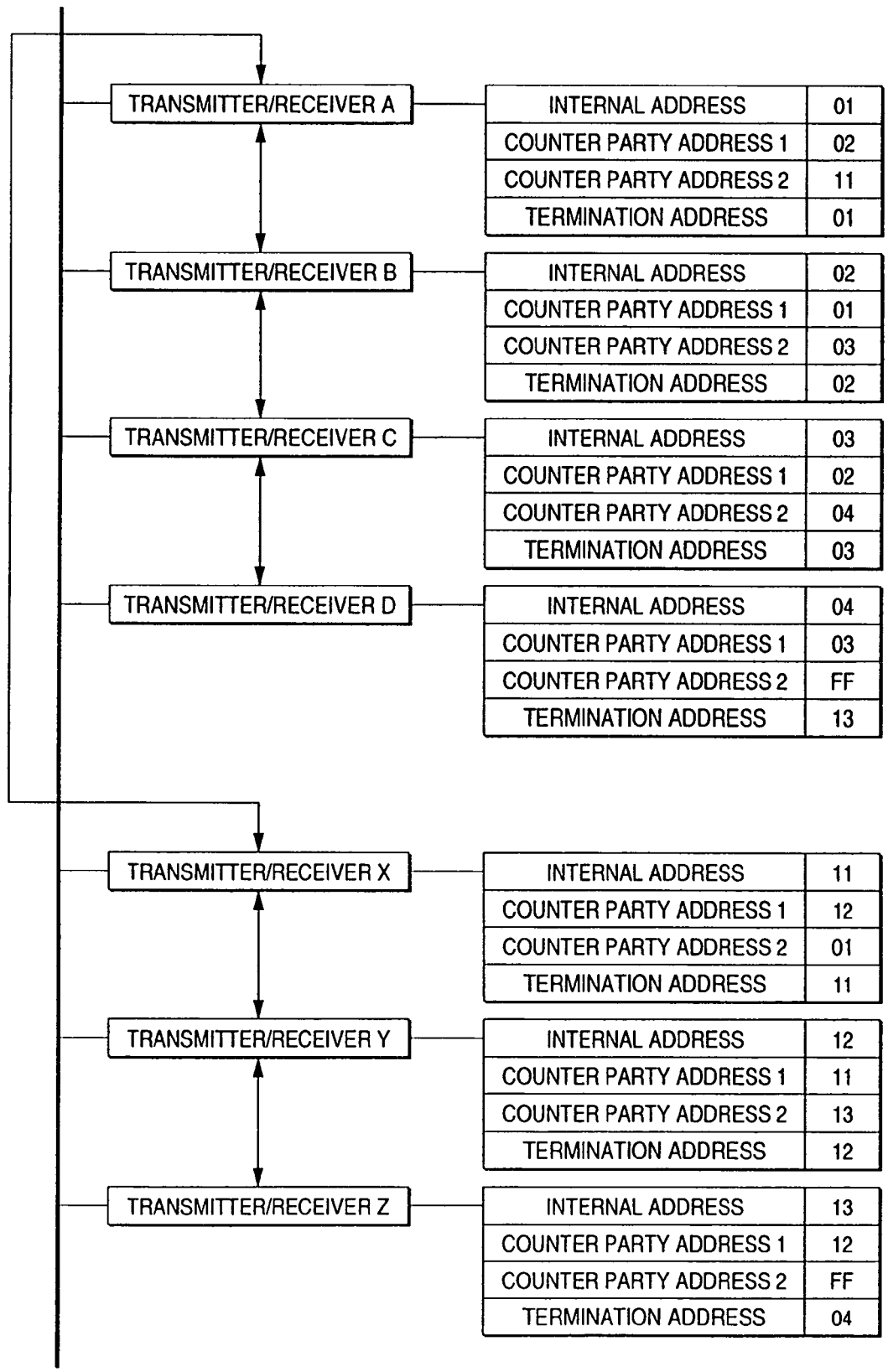
FIG. 16 is an explanatory diagram for explaining an example of the definition of the line-shaped transfer path of the embodiment 4.

When a preselected time period has passed under the above-described state of FIG. 16, the transmitter/receiver D transmits the communication address map of the own machine to all of the transmitters/receivers in accordance with the algorithm (A7).

In accordance with the algorithm (A8), the transmitter/receiver A; the transmitter/receiver B; the transmitter/receiver C; the transmitter/receiver X; and the transmitter receiver Y execute no process operation.

In accordance with the algorithm (A9), the transmitter/receiver Z changes the unconfirmed address of the extended communication address map of the own machine into "01", and then transmits the changed unconfirmed address to the transmitter/receiver D. As to this extended communication address map, the own machine address is "13"; the counter party address 1 is "12"; the counter party address 2 is "04"; and further the termination address is "04".

In accordance with the algorithm (A10), the transmitter/receiver D which has received the above-described extended communication address map executes no process operation.

As a result, the state shown in FIG. 16 is not changed.

A description will now be made of another example. It is now assumed that 3 transmitters/receivers A, B, C connected to a physical transfer path define a line-shaped transfer path. It is again assumed that the transmitter/receiver A, the transmitter/receiver B, and the transmitter/receiver C are arranged in this order of the alignment.

As to the extended communication address maps of these transmitters/receivers, the following addresses are defined: As to the transmitter/receiver A, the own machine address is "01"; the counter party address 1 is "02"; the counter party address 2 is an unconfirmed address "FF"; and the termination address is "04". As to the transmitter/receiver B, the own machine address is "02"; the counter party address 1 is "01"; the counter party address 2 is "03"; and the termination address is "02". As to the transmitter/receiver C, the own machine address is "03"; the counter party address 1 is "02"; the counter party address 2 is an unconfirmed address "FF"; and the termination address is "03".

Figure 17:
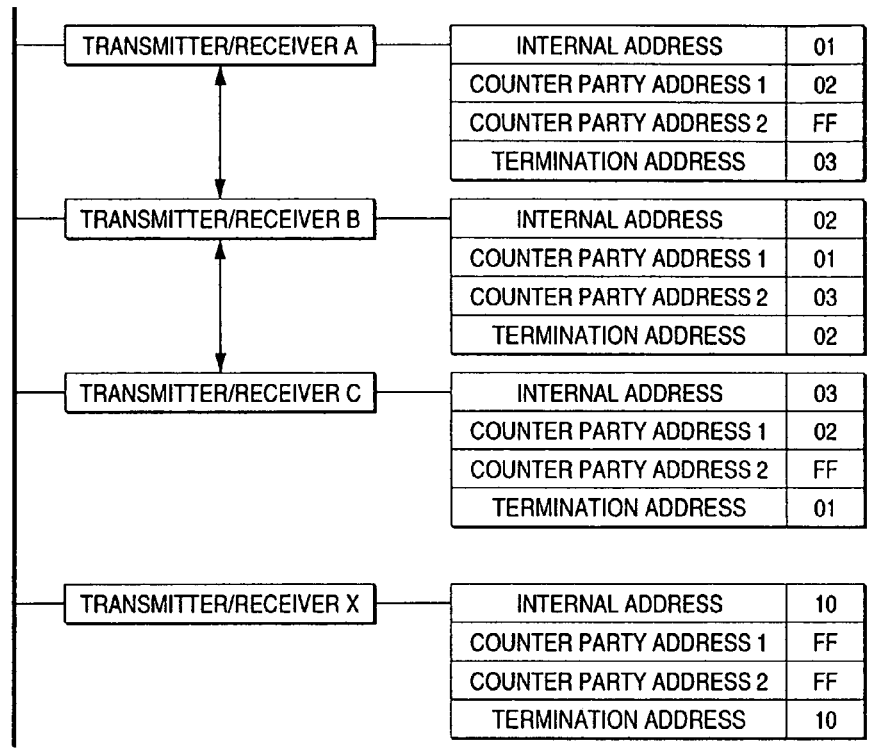
FIG. 17 is an explanatory diagram for explaining an example of the definition of the line-shaped transfer path of the embodiment 4.

The transmitter/receiver X is newly added to the physical transfer path which defines this line-shaped transfer path. In accordance with the algorithm (A1), as to the extended communication address map of the transmitter/receiver X, the own machine address is "10"; the counter party address 1 is an unconfirmed address "FF"; the counter party address 2 is an unconfirmed address "FF"; and the termination address is "10". This state is shown in FIG. 17.

The transmitter/receiver X transmits the communication address map of the own machine to all of the transmitters/receivers in accordance with the algorithm (A7).

In accordance with the algorithm (A8), the transmitter/receiver B executes no process operation.

In accordance with the algorithm (A9), the transmitter/receiver C and also the transmitter/receiver A transmit the extended communication address maps to the transmitter/receiver X. In this embodiment, it is now assumed that these extended communication address maps are transmitted from the transmitter/receiver C, and the transmitter/receiver A in this order.

As to the extended communication address map transmitted by the transmitter/receiver C, the own machine address is "03"; the counter party address 1 is "02"; the counter party address 2 is "10"; and the termination address is "01". The transmitter/receiver X which has received this extended communication address map changes the extended communication address map of the own machine in accordance with the algorithm (A11). As to the changed communication address map of the transmitter/receiver X, the own machine address is "10"; the counter party address 1 is "03"; the counter party address 2 is an unconfirmed address "FF"; and the termination address is "10". The transmitter/receiver X transmits this extended communication address map to the transmitter/receiver C.

After the extended communication address map has been transmitted, the transmitter/receiver X transmits the address "01" of the termination address of the received extended communication address map to the transmitter/receiver X itself. After this address map transmission, the transmitter/receiver X updates the termination address by the own machine address. However, since this termination address is equal to the own machine address, the transmitter/receiver X does not perform the update operation. The transmitter/receiver X receives the termination address, so that the termination address of this transmitter/receiver X becomes "01".

Under this state, the transmitter/receiver X receives the extended communication address map of the transmitter/receiver A. At this time, since the unconfirmed address is not saved in the communication address map of the transmitter/receiver X, this transmitter/receiver X executes no process operation in accordance with the algorithm (A8).

In accordance with the algorithm (A11), the transmitter/receiver C which has received the extended communication address map transmitted by the transmitter/receiver X changes the extended communication address map of the own machine. As to the changed extended communication address map of this transmitter/receiver X, the own machine address is "03"; the counter party address 1 is "02"; the counter party address 2 is "10"; and the termination address is "01". The transmitter/receiver X transmits this changed extended communication address map to the transmitter/receiver C. After this map transmission, the transmitter/receiver X transmits an address "10" of the termination address of this received extended communication address map to the transmitter/receiver A. After the address "10" of this termination address has been transmitted, the transmitter/receiver X changes the termination address of the own machine into "03".

The transmitter/receiver X which has again received the extended communication address map which was transmitted by the transmitter/receiver C executes no process operation in accordance with the algorithm (A13).

The transmitter/receiver A which has received the termination address transmitted from the transmitter/receiver C changes the termination address of the own machine into "10".

Figure 18:
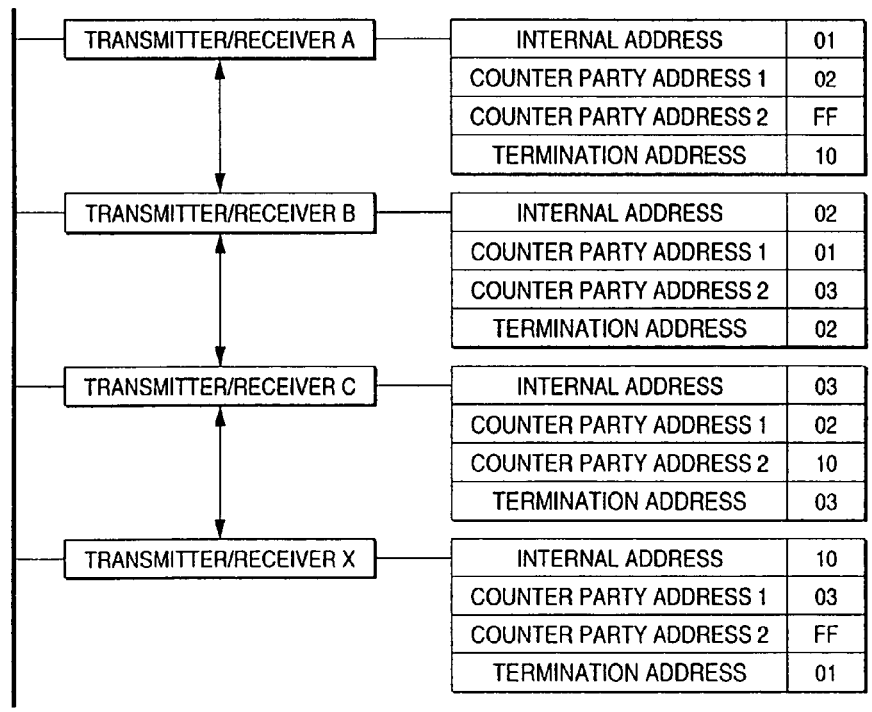
FIG. 18 is an explanatory diagram for explaining an example of the definition of the line-shaped transfer path of the embodiment 4.

Under this state, the update operations of the extended communication address map owned in the respective transmitters/receivers are accomplished which are commenced by transmitting the extended communication address map of the transmitter/receiver X. This state is indicated in FIG. 18. When all of the transmitters/receivers are aligned, the transmitter/receiver A; the transmitter/receiver B; the transmitter/receiver C; and the transmitter/receiver X are aligned in this order.

When a preselected time period has passed under the above-described condition of FIG. 18, the transmitter/receiver A transmits the communication address map of the own machine to all of the transmitters/receivers in accordance with the algorithm (A7).

In accordance with the algorithm (A8), the transmitter/receiver B; and the transmitter/receiver C execute no process operation.

In accordance with the algorithm (A9), the transmitter/receiver D changes the unconfirmed address of the extended communication address map of the own machine into "01", and then transmits the changed address to the transmitter/receiver A. As to this extended communication address map, the own machine address is "10"; the counter party address 1 is "03"; the counter party address 2 is "01"; and further the termination address is "01".

The transmitter/receiver A which has received the above-described extended communication address map executes no process operation in accordance with the algorithm (A10).

As a consequence, the state shown in FIG. 16 is not changed.

Figure 19:
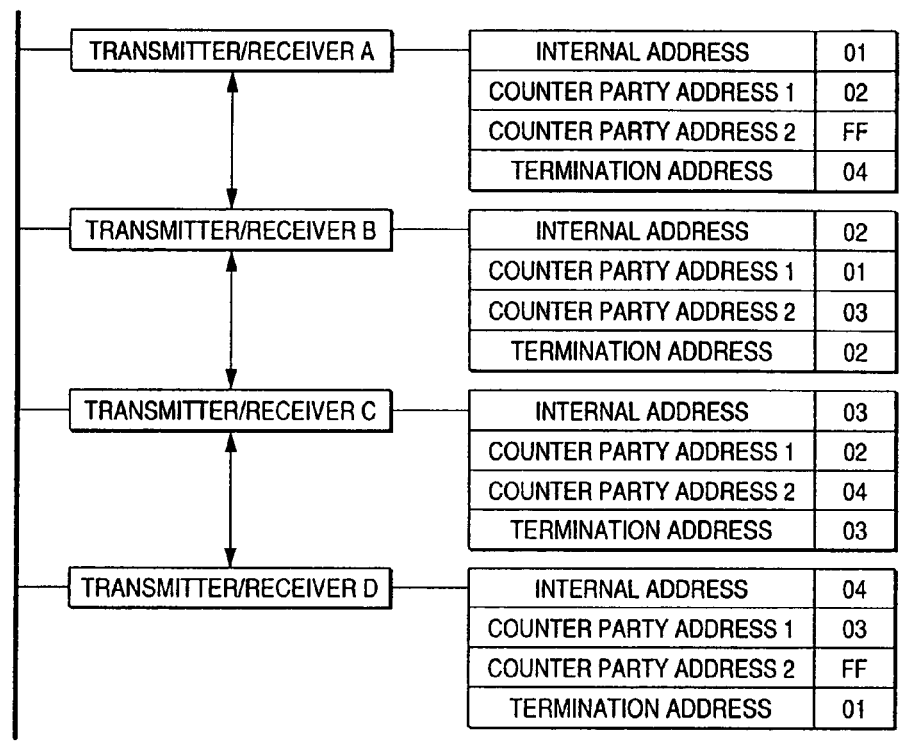
FIG. 19 is an explanatory diagram for explaining an example of the definition of the line-shaped transfer path of the embodiment 4.

Another example will now be explained. It is now assumed that as shown in FIG. 19, 4 transmitters/receivers connected to a physical transfer path define a line-shaped transfer path having a length of 4. The line-shaped transfer path is arranged by a transmitter/receiver A; a transmitter/receiver B; a transmitter/receiver C; and also a transmitter/receiver D in the order of the alignment. As to the extended communication address maps of these transmitters/receivers, the following addresses are defined: As to the transmitter/receiver A, the own machine address is "01"; the counter party address 1 is "02"; the counter party address 2 is an unconfirmed address "FF"; and the termination address is "04". As to the transmitter/receiver B, the own machine address is "02"; the counter party address 1 is "01"; the counter party address 2 is "03"; and the termination address is "02". As to the transmitter/receiver C, the own machine address is "03"; the counter party address 1 is "02"; the counter party address 2 is "04"; and the termination address is "03". As to the transmitter/receiver D, the own machine address is "04"; the counter party address 1 is "03"; the counter party address 2 is an unconfirmed address "FF"; and the termination address is "01".

Figure 20:
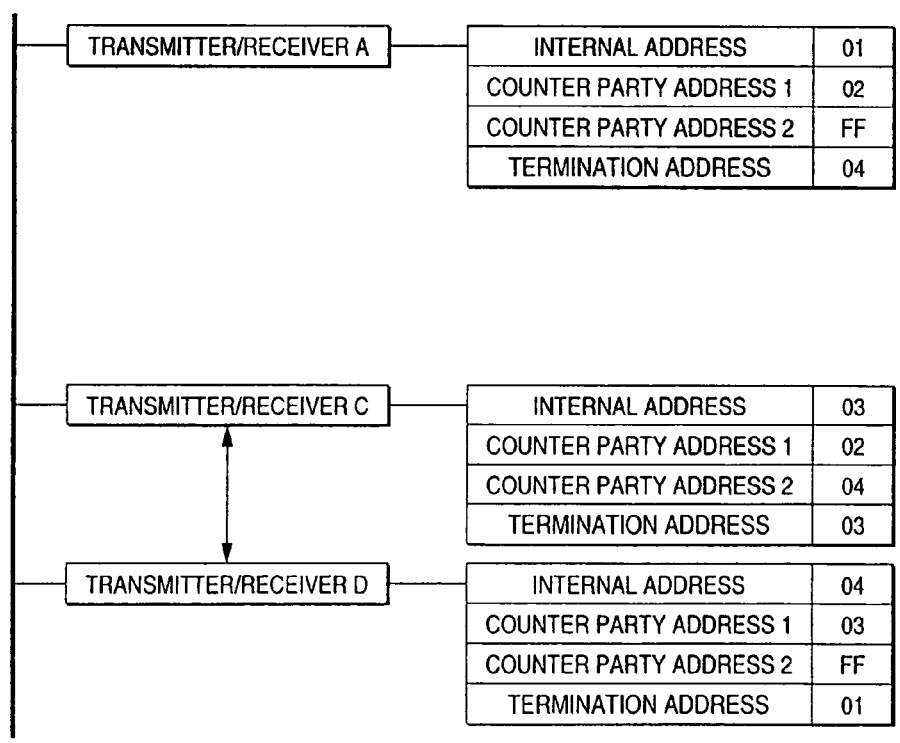
FIG. 20 is an explanatory diagram for explaining an example of the definition of the line-shaped transfer path of the embodiment 4.

It is now assumed that the transmitter/receiver B is disconnected from this line-shaped transfer path having the length of 4. This state is shown in FIG. 20.

In accordance with the algorithm (A2), the transmitter/receiver A transmits the communication address map of the own machine to the counter party address "02". Since the transmitter/receiver of the address "02" is not present on the physical transfer path, the transmitter/receiver A changes the extended communication address map of the own machine in accordance with the algorithm (A6), and then the own machine address is "01"; the counter party address 1 is an unconfirmed address "FF"; the counter party address 2 is an unconfirmed address "FF"; and the termination address is "01".

Figure 21:
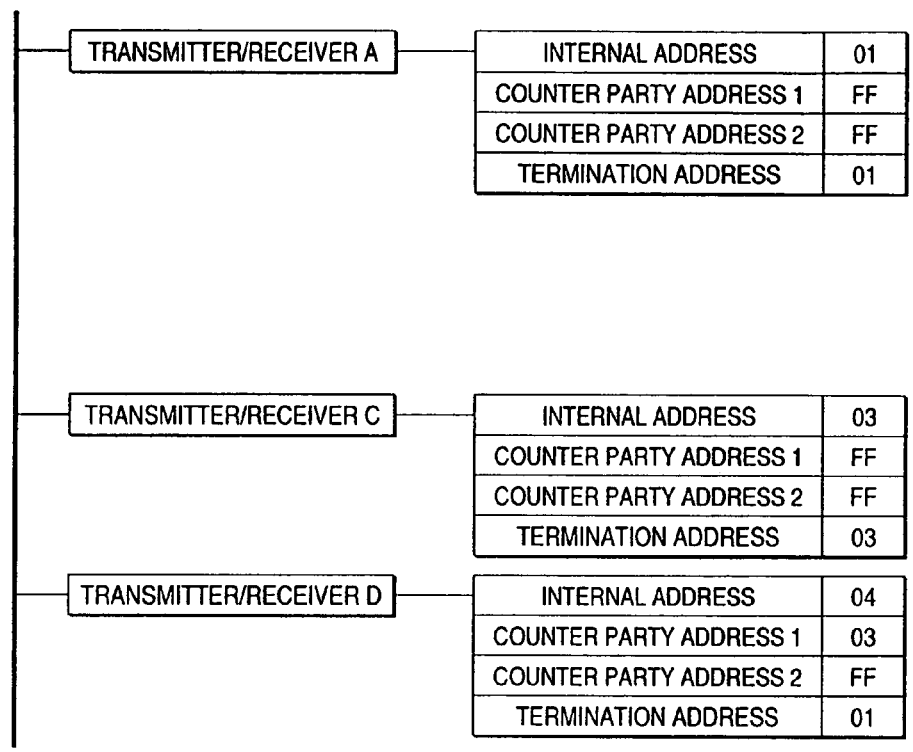
FIG. 21 is an explanatory diagram for explaining an example of the definition of the line-shaped transfer path of the embodiment 4.

Also, in accordance with the algorithm (A2), the transmitter/receiver C transmits the communication address map of the own machine to the counter party address "02", and also the transmitter/receiver D. Since the transmitter/receiver of the address "02" is not present on the physical transfer path, the transmitter/receiver C changes the extended communication address map of the own machine in accordance with the algorithm (A6), and then the own machine address is "03"; the counter party address 1 is an unconfirmed address "FF"; the counter party address 2 is an unconfirmed address "FF"; and the termination address is "03". This state is indicated in FIG. 21.

Figure 22:
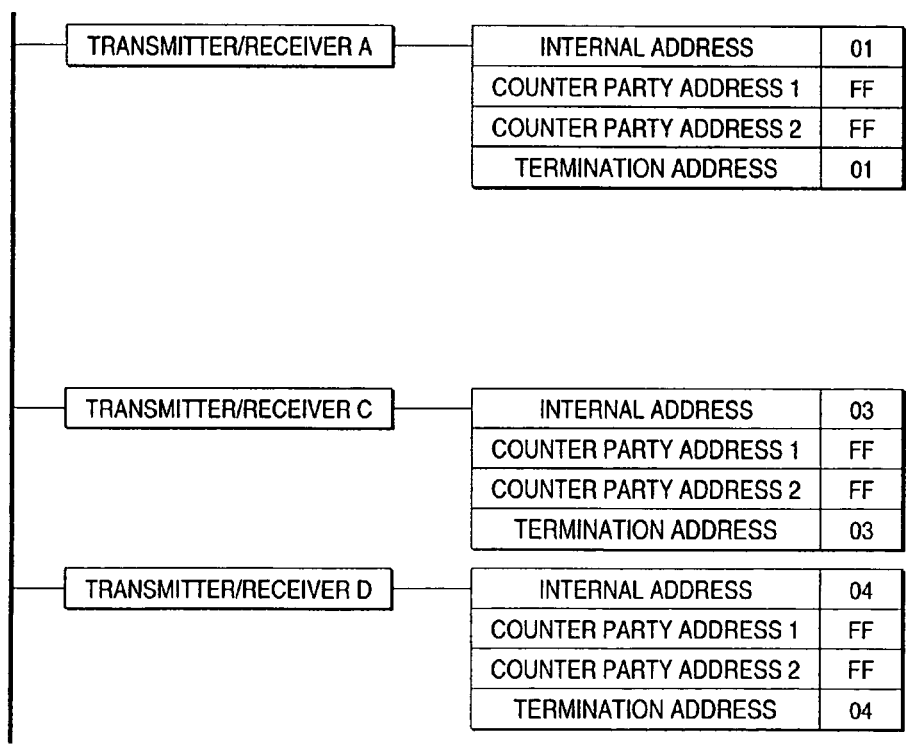
FIG. 22 is an explanatory diagram for explaining an example of the definition of the line-shaped transfer path of the embodiment 4.

The transmitter/receiver D transmits the communication address map of the own machine to the transmitter/receiver C in accordance with the algorithm (A2). Since two counter party addresses of the transmitter/receiver C are unconfirmed addresses "FF", the transmitter/receiver D does not receive a presence confirmation signal. As a result, in accordance with the algorithm (A6), the extended communication address map of the transmitter/receiver D is changed, and the own machine address is "04"; the counter party address 1 is an unconfirmed address "FF"; the counter party address 2 is an confirmed address "FF"; and also the termination address is "04". This state is indicated in FIG. 22.

As explained above, the extended communication address maps contained in all of the transmitters/receivers are set to initial states.

The transmitters/receivers may define the line-shaped transfer path from this state similar to the previously indicated example.

In accordance with the algorithm (A1), under the initial states of the respective transmitters/receivers, two counter party addresses are unconfirmed addresses, and a termination address is the own machine address. As a consequence, it is possible to say such a fact that the extended communication address map under initial state defines a line-shaped transfer path having a length of 1. Since the algorithms (A1) through (A14) correspond to such an algorithm for producing an line-shaped transfer path from another line-shaped transfer path, there is no possibility that a loop-shaped transfer path is defined in a set of transmitters/receivers.

A description will now be made of a method for distributing contents data in a set of transmitters/receivers having such a line-shaped transfer path.

When contents data is transmitted, data (will be referred to as an "transmission source address" hereinafter) for specifying a transmission source of the contents data is added to the contents data, and then the address-added contents date is transmitted. Also, after such a transmitter/receiver which has received the contents data from a physical transfer path other than the above-described physical transfer path adds the own machine address to the contents data as the transmission source address, this transmitter/receiver transmits the address-added contents data to another transmitter/receiver defined by two counter party addresses. When a counter party address is an unconfirmed address, since a counter party transmitter/receiver is not confirmed, a transmission of contents data is not carried out.

A transmitter/receiver which has received the contents data transmits the contents data to such a transmitter/receiver addressed by such a counter party address which is different from the transmission source address among the counter party addresses with reference to a communication address map. At this time, the first-mentioned transmitter/receiver adds the address of the own machine as the transmission source to the contents data, and then transmits the address-added contents data to the last-mentioned transmitter/receiver.

In such a case that a transmitter/receiver has received contents data and counter party addresses of a communication address map thereof are both a transmission source address and an unconfirmed address, this transmitter/receiver does not transmit the contents data.

As a result, the contents data are distributed to all of the transmitters/receivers.

Conventionally, while managing the arrangement of the transmitters/receivers on the data transfer operation, the management result is required to be set to the respective transmitters/receivers. However, when such a contents data distributing method of the present invention is employed, if the transmitters/receivers are physically connected to the physical transfer path, then the data transfer sequence of these transmitters/receivers is automatically formed, so that the data can be automatically distributed.

Embodiment 5

An embodiment 5 of the present invention will now be explained. According to embodiment 5, each of transmitters/receivers contains an internal address used to specify a transmitting/receiving unit. This internal address is set in such a manner that the internal addresses of all of the transmitters/receivers which perform data communications are not doubled. A transmitter/receiver addresses a desirable transmitter/receiver by using this internal address so as to execute a data communication. Also, each of these transmitters/receivers has the extended communication address map as explained in the embodiment 4. Furthermore, as to a communication address map, 14 types of algorithms (A1 to A14) represented in embodiment 4 are defined.

A set of such transmitters/receivers defines the line-shaped transfer path as indicated in the embodiment 4.

While utilizing the extended communication address map for defining such a line-shaped transfer path, a description will now be made of a method for acquiring information about a transmitter/receiver written in a scheduled transfer destination database used to transfer contents data.

When a transmitter/receiver X forms a scheduled transfer destination database, the transmitter/receiver X transmits a database preparation file to such a transmitter/receiver indicated by a counter party address 1 of a communication address map included in the transmitter/receiver X. The database preparation file is equal to a text file on which one line of the own machine address of the transmitter/receiver X is written.

The transmitter/receiver which has received the database preparation file sent from the transmitter/receiver reads out the first line of the database preparation file, and when this read address is different from the own machine address, this transmitter/receiver adds the own machine address to a final line of this database preparation file. The transmitter/receiver transmits this address-added database preparation file to such a transmitter/receiver which is not described in the database preparation file among the counter party addresses of the communication address map contained in the own machine.

The transmitter/receiver which has received the database preparation file sent from the transmitter/receiver reads out the first line of the database preparation file, and when this read address is different from the own machine address, this transmitter/receiver adds the own machine address to a final line of this database preparation file. In the case that in this database preparation file, one of the counter party addresses of the communication address map contained in the own machine is an unconfirmed address, and the other of the counter party addresses thereof is described in the database preparation file, the database preparation file is transmitted to such a transmitter/receiver which is addressed by a termination address.

The transmitter/receiver which has received the database preparation file sent from the transmitter/receiver reads out the first line of the database preparation file, and when this read address is equal to the own machine address, the address data described in the database preparation file will constitute such an address of a transmitter/receiver described in a scheduled transfer destination database.

Conventionally, while managing the arrangement of the transmitters/receivers on the data transfer operation, the management result is required to be set to the respective transmitters/receivers, and also the transfer means must be set to the respective transmitters/receivers. However, when such a contents data distributing method of the present invention is employed, if the transmitters/receivers are physically connected to the physical transfer path, then the data transfer sequence of these transmitters/receivers is automatically formed, so that the data can be automatically distributed. Also, the transfer database can be automatically produced by using this automatically set arrangement information.

Embodiment 6

Next, an embodiment 6 of the present invention will now be explained. When a transmitter/receiver acquires new contents data, this transmitter/receiver transmits a name of a transmitter/receiver to all of the transmitters/receivers connected to a physical transfer path in connection with a name of contents data. When a transmitter/receiver which has received this transmission does not contain the relevant contents data in the own machine, this transmitter/receiver requests the transmission source transmitter/receiver to transmit the contents data. The transmitter/receiver which has received the transmission request transmits the contents data to such a transmitter/receiver which firstly issues the transmission request.

After the contents data has been transmitted, the transmitter/receiver again transmits a name of a transmitter/receiver to all of these transmitters/receivers in connection with a name of contents data, and repeatedly transfers the contents data. When there is no response with respect to the request related to both the name of the transmitter/receiver and the name of the contents data, the transmitter/receiver stops the contents data transfer operation.

Conventionally, the data transfer sequence is required to be set to the respective transmitters/receivers. However, when such a method is employed, the data can be automatically transferred.

Embodiment 7

Next, an embodiment 7 of the present invention will now be explained. When a transmitter/receiver acquires new contents data to which a scheduled transfer destination database is not attached, this transmitter/receiver transmits a name of a transmitter/receiver to all of the transmitters/receivers connected to a physical transfer path in connection with a name of contents data. When a transmitter/receiver which has received this transmission does not contain the relevant contents data in the own machine, this transmitter/receiver requests the transmission source transmitter/receiver to transmit the contents data. The transmitter/receiver which has received this transmission request forms a scheduled transfer destination database in which the transmitter/receiver which has issued the transfer request is set as a data transfer destination. While using this scheduled transfer destination database, the transmitter/receiver commences the transfer operations of both the scheduled transfer destination database and the contents data.

Conventionally, the data transfer sequence is required to be set to the respective transmitters/receivers. However, when such a method is employed, the data can be automatically transferred.

Since the present invention is accomplished by employing the above-described arrangements, the following effects can be achieved.

The artificial actions related to the data transfer operation can be reduced. Also, while the respective transmitters/receivers utilize the scheduled transfer destination database in the process operation for transferring the data, these transmitters/receivers can effectively use the task process operation required to transfer the data, and also the data transfer lines.

Also, the data can be automatically transferred.

Also, since the transmission paths are radially enlarged, the data can be transferred to all of the transmitters/receivers in a high efficiency.

Also, since the data is transferred in response to the load state on the data reception side, when the transmitter/receiver on the counter party side cannot allow to share the process time for transferring the data, the data can be automatically transferred after other task process operation is accomplished.

Also, the respective transmitters/receivers can secure the information about the transmitter/receiver connected to the physical transfer path by using the featured transmitting/receiving unit, and can automatically produce the scheduled transfer destination database by using this information.

Also, the respective transmitters/receivers can automatically form the scheduled transfer destination database by using the data managing information of other transmitters/receivers.

Also, the respective transmitters/receivers can secure the information about the transmitter/receiver connected to the physical transfer path by using the featured transmitting/receiving unit, can acquire the data managing information of other transmitters/receivers by using this information, and further can automatically produce the scheduled transfer destination database by using this information.

Also, the respective transmitters/receivers can secure the information about the transmitter/receiver connected to the physical transfer path by using the featured transmitting/receiving unit, and can automatically transfer the data.

Also, the respective transmitters/receivers can automatically transfer the data by using the data managing information of other transmitters/receivers.

Also, the respective transmitters/receivers can secure the information about the transmitter/receiver connected to the physical transfer path by using the featured transmitting/receiving unit, and can acquire the data managing information of other transmitters/receivers by using this information, and further can automatically transfer the data by using this information.

Also, the respective transmitters/receivers can secure the information about the transmitter/receiver connected to the physical transfer path by using the communication address map, and can automatically transfer the data by using this information.

What is claimed is:

1. A method of transmitting content data to a plurality of destination transmitter/receiver units via a network, said method comprising the steps of:

providing a database including transfer destination information, said transfer destination information being a list of two or more of the plurality of destination transmitter/receiver units, thereby indicating that the identified destination transmitter/receiver units are scheduled to receive content data, wherein said database includes status flags associated with the identified destination transmitter/receiver units, respectively, each of the status flags specifying whether the associated destination transmitter/receiver unit has yet received the content data, and wherein said content data is not used for routing other data in the network; and transferring said database including the list and said content data via the network to a destination transmitter/receiver unit identified by said transfer destination information, wherein the destination transmitter/receiver unit receiving the transferred database and content data is configured to be a transfer-source transmitter/receiver unit, which performs the following in response to the transfer:

analyzes the transfer destination information and the status flags in the received database in order to determine which of the identified destination transmitter/receiver units in the list in the received database have not yet received the content data, and to individually select one of the determined destination transmitter/receiver units to be a transfer-destination transmitter/receiver unit, and transfers the content data and the database including the list and the status flags to the selected transfer-destination transmitter/receiver unit.

2. The method according to claim 1, the method further comprising:

transferring a transfer preparation signal to the transfer-destination transmitter/receiver unit before transferring the content data, wherein:

when the transfer-destination transmitter/receiver unit can receive the content data and the database, the transfer-destination transmitter/receiver unit transmits a transfer preparation completion signal to the transfer-source transmitter/receiver unit, and the transfer-source transmitter/receiver unit, which has received the transfer preparation completion signal, transmits the database and the content data;

when the transfer-destination transmitter/receiver unit cannot receive the content data and the database, the transfer-destination transmitter/receiver unit transmits a transfer preparation incompletion signal, and the transmission-source transmitter/receiver unit, which has received the transfer preparation incompletion signal, selects another destination transmitter-receiver unit, which has been determined not to have received the content data, as the transfer-destination transmitter/receiver unit on the basis of the first information.

3. The method according to claim 2, wherein:

the transfer-source transmitter/receiver unit transfers the transfer preparation signal to the selected transfer-destination transmitter/receiver unit before transferring the data content to the another transmitter/receiver unit;

when the selected transfer-destination transmitter/receiver unit can receive the content data and the database, the selected transfer-destination transmitter/receiver unit transfers the transfer preparation completion signal to the transfer-source transmitter/receiver unit; and when the transfer-source transmitter/receiver unit has received the transfer preparation completion signal, the transfer-source transmitter/receiver unit transfers the content data and the database to the selected transfer-destination transmitter/receiver unit.

4. The method according to claim 3, wherein:

when all the determined transmitter/receiver units cannot receive the content data and the database, the transfer-source transmitter/receiver unit pauses a process regarding the data transfer and then selects a transfer-destination transmitter/receiver from those determined not to have received the content data, again.

5. The method according to claim 1, wherein:

in a case of transferring the content data to the plurality of destination transmitter/receiver units, the transfer-source transmitter/receiver unit transfers to one transfer-destination transmitter/receiver unit the content data and the database including the transfer destination information listing each destination transmitter/receiver unit scheduled to receive the content data, thereby completing a transfer process for the transfer-source transmitter/receiver unit.

6. The method according to claim 5, wherein:

the transfer-destination transmitter/receiver unit transfers to another destination transmitter/receiver unit listed in the transfer destination information the content data and the database including the transfer destination information, thereby completing a transfer process for the transfer-destination transmitter/receiver unit.

7. The method according to claim 6, wherein each of the destination transmitter/receiver units has first information indicating transmission/reception states of the content data at all the destination transmitter/receiver units;

in response to receiving the database, the transfer-source transmitter/receiver unit updates the first information based on the status flags in the database; and the updated first information is used by the transfer-source transmitter/receiver unit to determine the identified destination transmitter/receiver units, which have not yet received the content data, and from which the transfer-destination transmitter/receiver unit is selected.

8. The method according to claim 7, wherein still another destination transmitter/receiver unit, which has been determined not to have received the content data, is selected as a transfer-destination transmitter/receiver unit on the basis of the updated first information.

9. The method according to claim 5, wherein each of the destination transmitter/receiver units has first information indicating transmission/reception states of the content data at all the destination transmitter/receiver units;

in response to receiving the database, the transfer-source transmitter/receiver unit updates the first information based on the status flags in the database; and the updated first information is used by the transfer-source transmitter/receiver unit to determine the identified destination transmitter/receiver units, which have not yet received the content data, and from which the transfer-destination transmitter/receiver unit is selected.

10. The method according to claim 9, wherein still another destination transmitter/receiver unit, which has been determined not to have received the content data, is selected as a transfer-destination transmitter/receiver unit on the basis of the updated first information.

11. The method according to claim 1, the content data being transmitted to the destination transmitter/receiver units via a transfer path formed by a plurality of transmitter/receiver units, the destination transmitter/receiver units comprising at least a subset of the plurality of transmitter/receiver units, further comprising:
preparing at least one data storage location in each of the plurality of transmitter/receiver units to hold first information identifying at least one transmitter/receiver unit with which the transmitter/receiver units conducts data communication; and
executing a stored algorithm to align the plurality of transmitter/receiver units, thereby establishing the first information in each of the plurality of transmitter/receiver units,
wherein:
one data storage location is prepared in two of the plurality of transmitter/receiver units, such that the first information in each of the two transmitter/receiver units identifies a single transmitter/receiver unit,
two data storage locations are prepared in the others of the plurality of transmitter/receiver units, such that the first information in each of the other transmitter/receiver units identifies two transmitter/receiver units, respectively; and
each of the plurality of transmitter/receiver units conducts the database providing step on the basis of the first information of all the transmitter/receiver units.

12. The method according to claim 11, wherein:
the transfer-source transmitter/receiver unit, upon receiving the transferred database and content data, transfers second information indicating retention of the new content data to all the destination transmitter/receiver units identified by the transfer destination information;
when a destination transmitter/receiver unit receiving the second information does not hold the content data, the destination transmitter/receiver unit receiving the third information requests the transfer-source transmitter/receiver unit to transfer the new content data; and
the transfer-source transmitter/receiver unit selects the requesting destination transmitter/receiver unit as the transfer-destination transmitter/receiver unit.

13. The method according to claim 11, wherein the second information in each transmitter/receiver unit in the transfer path is a communication address map, the communication address map including:
an internal address field holding an address of the transmitter/receiver unit; and
two transfer-destination address fields, each corresponding to a respective direction of the transfer path.

14. The method according to claim 13, further comprising:
defining a communication address map at each of the transmitter/receiver units in the transfer path; and
using the defined communication address map to provide the database,
wherein, if needed, the communication address map is defined as an extended communication address map, which includes a termination address field.

15. The method according to claim 1, wherein:
each destination transmitter/receiver unit listed in the transfer destination information has first information indicating transmission/reception states of the content data at all destination transmitter/receiver units;
in response to receiving the database, the transfer-source transmitter/receiver unit updates the first information based on the status flags in the database; and
the updated first information is used by the transfer-source transmitter/receiver unit to determine the identified destination transmitter/receiver units, which have not yet received the content data, and from which the transfer-destination transmitter/receiver unit is selected.

16. A method of transmitting content data to a plurality of destination transmitter/receiver units via a network, the content data being transmitted to the destination transmitter/receiver units via a transfer path formed by a plurality of transmitter/receiver units, the destination transmitter/receiver units comprising at least a subset of the plurality of transmitter/receiver units, said method comprising the steps of:
preparing at least one data storage location in each of the plurality of transmitter/receiver units to hold first information identifying at least one transmitter/receiver unit with which the transmitter/receiver units conducts data communication;
executing a stored algorithm to align the plurality of transmitter/receiver units, thereby establishing the first information in each of the plurality of transmitter/receiver units;
providing a database including transfer destination information, said transfer destination information being a list of two or more of the plurality of destination transmitter/receiver units, thereby indicating that the identified destination transmitter/receiver units are scheduled to receive content data, wherein said content data is not used for routing other data in the network; and
transferring said database including the list and said content data via the network to a destination transmitter/receiver unit identified by said transfer destination information,
wherein the destination transmitter/receiver unit receiving the transferred database and content data is configured to be a transfer-source transmitter/receiver unit, which performs the following in response to the transfer:
processes the transfer destination information in the received database in order to individually select another destination transmitter/receiver unit from the list in the received database to be a transfer-destination transmitter/receiver unit; and
transfers the database including the list and content data to the selected transfer-destination transmitter/receiver unit,
wherein:
one data storage location is prepared in two of the plurality of transmitter/receiver units, such that the first information in each of the two transmitter/receiver units identifies a single transmitter/receiver unit,
two data storage locations are prepared in the others of the plurality of transmitter/receiver units, such that the first information in each of the other transmitter/receiver units identifies two transmitter/receiver units, respectively; and
each of the plurality of transmitter/receiver units conducts the database providing step on the basis of the first information of all the transmitter/receiver units, and
wherein a destination transmitter/receiver is specified by using an extended communication address map defined by algorithms A1 to A14 as follows:

A1: under an initial state of a particular transmitter/receiver unit in the transfer path, a communication address map owns two unconfirmed addresses;

A2: the particular transmitter/receiver unit transmits the communication address map in a predetermined time interval to such a transmitter/receiver unit addressed by a counter party address of the communication address map;

A3: in a case that an own machine address saved in the communication address map is present in a counter party address of the communication address map of the own machine, the transmitter/receiver unit which has received the communication address map transmits a signal (will be referred to as a "presence confirmation signal" hereinafter) indicative of presence containing information of the own machine address to a transmitter/receiver unit addressed by the own machine address of the received communication address map;

A4: in a case that an own machine address saved in the communication address map is not present in a counter party address of the communication address map of the own machine, the transmitter/receiver unit which has received the communication address map changes the two counter party addresses of the own machine into unconfirmed addresses, and changes a termination address into the own machine address;

A5: a transmitter/receiver that after having transmitted the communication address map, receives the presence confirmation signals sent from all of the transmitters/receivers addressed by the counter party addresses and for transmitting the communication address maps within a predetermined time period executes no process operation;

A6: if, after having transmitted the communication address map, the particular transmitter/receiver unit does not receive the presence confirmation signals sent from all of the transmitter/receiver units addressed by the counter party addresses within a predetermined time period, the particular transmitter/receiver unit changes the two counter party addresses of the own machine into unconfirmed addresses, and changes the termination address into the own machine address;

A7: a transmitter/receiver unit having an unconfirmed address is brought into a waiting state for a predetermined time period by using the random number, and thereafter transmits an extended communication address map contained in the own machine to all of the transmitters/receivers;

A8: a transmitter/receiver unit containing a communication address map having a confirmed address receives the extended communication address map executes no process operation;

A9: a transmitter/receiver unit containing a communication address map having an unconfirmed address that receives the extended communication address map writes the own machine address of the received extended communication address map into a counter party address for describing thereon the unconfirmed address of the extended communication address map of the own machine, and transmits the extended communication address map to the own machine address of the received extended communication address map, wherein the communication address map of the own machine is not changed;

A10: a transmitter/receiver unit which has transmitted an extended communication address map and thereafter receives the extended communication address map confirms a termination address of the received extended communication address map, and executes no further process operation if the termination address is equal to the own machine address;

A11: a transmitter/receiver unit which has transmitted an extended communication address map and thereafter receives the extended communication address map confirms a transmission address of the received extended communication address map if a termination address of the received extended communication address map is not equal to the own machine address, and performs the following when the own machine address is described in the transmission address:

describes the own machine of the received communication address map in the counter party address on which the unconfirmed address of the communication address map contained in the own machine is described, further transmits an extended communication map using the changed communication address map to the own machine address of the received communication address, transmits to a transmitter/receiver described in the termination address map of the own machine, such a termination address of the received extended communication address map after having transmitted the extended communication map, and thereafter, changes the termination address map into the own machine address;

A12: a transmitter/receiver unit which has received a termination address changes the content of the termination address map of the own machine into the received termination address;

A13: a transmitter/receiver unit, which again receives the extended communication address map after receiving the extended communication address map and transmitting the extended communication address map, compares the received extended communication address map with the previously-received extended communication address map, and executes no further process operation when the extended communication address maps own the same contents with each other, or follows algorithm A11 when the extended communication address maps own different contents from each other; and A14: after having transmitted the communication address map, a transmitter/receiver unit, which does not receive a communication address map within a predetermined time period, discards such information on which the transmission of the communication address map is recorded.

17. A method of transmitting content data to a plurality of destination transmitter/receiver units via a network, the content data being transmitted to the destination transmitter/receiver units via a transfer path formed by a plurality of transmitter/receiver units, the destination transmitter/receiver units comprising at least a subset of the plurality of transmitter/receiver units, said method comprising the steps of:

preparing at least one data storage location in each of the plurality of transmitter/receiver units to hold first information identifying at least one transmitter/receiver unit with which the transmitter/receiver units conducts data communication;

executing a stored algorithm to align the plurality of transmitter/receiver units, thereby establishing the first information in each of the plurality of transmitter/receiver units;

providing a database including transfer destination information, said transfer destination information being a list of two or more of the plurality of destination transmitter/receiver units, thereby indicating that the identified destination transmitter/receiver units are scheduled to receive content data, wherein said content data is not used for routing other data in the network; and transferring said database including the list and said content data via the network to a destination transmitter/receiver unit identified by said transfer destination information, wherein the destination transmitter/receiver unit receiving the transferred database and content data is configured to be a transfer-source transmitter/receiver unit, which performs the following in response to the transfer:

processes the transfer destination information in the received database in order to individually select another destination transmitter/receiver unit from the list in the received database to be a transfer-destination transmitter/receiver unit; and transfers the database including the list and content data to the selected transfer-destination transmitter/receiver unit, wherein:

one data storage location is prepared in two of the plurality of transmitter/receiver units, such that the first information in each of the two transmitter/receiver units identifies a single transmitter/receiver unit, two data storage locations are prepared in the others of the plurality of transmitter/receiver units, such that the first information in each of the other transmitter/receiver units identifies two transmitter/receiver units, respectively, and each of the plurality of transmitter/receiver units conducts the database providing step on the basis of the first information of all the transmitter/receiver units, and wherein:

each of the plurality of transmitter/receiver units includes a communication address map having:

an internal address identifying each transmitter/receiver unit itself; and two transfer-destination addresses each identifying a transfer-destination transmitter/receiver unit;

the database is prepared on the basis of the communication address map satisfying the following five algorithms:

algorithm 1:

when a first transmitter/receiver unit receives the communication address map and one of the transfer-destination addresses of the first transmitter/receiver unit is contained in the internal address of the received communication address map, the first transmitter/receiver unit transfers a presence confirmation signal indicating presence of the first transmitter/receiver unit and including information of an address of the first transmitter/receiver unit to a second transmitter/receiver unit, which is identified by the internal address of the received communication address map; and when the first transmitter/receiver unit receives the communication address map and none of the transfer-destination addresses of the first transmitter/receiver unit is contained in the internal address of the received communication address map, the first transmitter/receiver unit changes each of two transfer-destination addresses of the first transmitter/receiver unit into an unconfirmed address and changes a termination address into the internal address of the first transmitter/receiver unit, algorithm 2:

when the first transmitter/receiver unit transfers the communication address map and then receives the presence confirmation signal from all transmitter/receiver units identified by the transfer-destination addresses of the first transmitter/receiver unit in a predetermined period, the first transmitter/receiver unit performs nothing; and when the first transmitter/receiver unit transfers the communication address map but does not receive the presence confirmation signal from all transmitter/receiver units identified by the transfer-destination addresses of the first transmitter/receiver unit in a predetermined period, the first transmitter/receiver unit changes the transfer-destination addresses of the first transmitter/receiver unit into the unconfirmed address and changes the termination address into the internal address of the first transmitter/receiver unit, algorithm 3:

when the communication address map of the first transmitter/receiver unit has the unconfirmed address and the first transmitter/receiver unit receives an extended communication address map, the first transmitter/receiver unit writes the internal address of the received extended communication address map into the transfer-destination address, which is the unconfirmed address, transfers the received extended communication address map to the internal address of the received extended communication address map, and does not change the communication address map of the first transmitter/receiver unit, algorithm 4:

in the case that the first transmitter/receiver unit receives the communication address map after transferring the extended communication address map and the termination address of the received extended communication address map is not the internal address of the first transmitter/receiver unit, the first transmitter/receiver unit checks the transfer-destination addresses of the extended communication address map, and when the internal address of the first transmitter/receiver unit is described in the transfer-destination addresses of the extended communication address map, the first transmitter/receiver unit writes the internal address of the received extended communication address map into one of the transfer-destination addresses of the first transmitter/receiver unit, which is the unconfirmed address, and the first transmitter/receiver unit transfers the extended communication address map employing the changed communication address map to the internal address of the received extended communication address map, and after transferring the extended communication address map, the first transmitter/receiver unit transfers the termination address of the received extended communication address map to a second transmitter/receiver unit, which is identified by a termination address map of the first transmitter/receiver unit, and after transferring, the first transmitter/receiver unit changes the termination address map into the internal address of the first transmitter/receiver unit, and algorithm 5:

when the first transmitter/receiver unit receives the termination address, the first transmitter/receiver unit changes the termination address map of the first transmitter/receiver unit into the received termination address.

* * * * *